US012200718B2

United States Patent
Meylan et al.

(10) Patent No.: US 12,200,718 B2
(45) Date of Patent: Jan. 14, 2025

(54) TECHNIQUES FOR SCHEDULING COMMUNICATION RESOURCES

(71) Applicant: QUALCOMM Incorporated, San Diego, CA (US)

(72) Inventors: Arnaud Meylan, San Diego, CA (US); Leena Zacharias, San Jose, CA (US); Michel Chauvin, San Diego, CA (US); Ravi Agarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 17/501,873

(22) Filed: Oct. 14, 2021

(65) Prior Publication Data

US 2022/0124781 A1 Apr. 21, 2022

Related U.S. Application Data

(60) Provisional application No. 63/093,065, filed on Oct. 16, 2020.

(51) Int. Cl.
*H04W 72/23* (2023.01)
*H04W 72/1268* (2023.01)
*H04W 76/28* (2018.01)

(52) U.S. Cl.
CPC ....... *H04W 72/23* (2023.01); *H04W 72/1268* (2013.01); *H04W 76/28* (2018.02)

(58) Field of Classification Search
CPC .. H04W 72/23; H04W 76/28; H04W 72/1268
See application file for complete search history.

(56) References Cited

U.S. PATENT DOCUMENTS

2016/0366682 A1\* 12/2016 Tseng ................... H04W 72/04
2017/0019918 A1\* 1/2017 Voigt .................... H04W 28/26
(Continued)

FOREIGN PATENT DOCUMENTS

| EP | 3672348 A1 | 6/2020 |
| WO | WO-2020029070 A1 | 2/2020 |
| WO | WO-2020032695 A1 | 2/2020 |

OTHER PUBLICATIONS

International Search Report and Written Opinion—PCT/US2021/055162—ISA/EPO—Mar. 2, 2022.

*Primary Examiner* — Kevin M Cunningham
(74) *Attorney, Agent, or Firm* — Dalei Dong; Holland & Hart LLP

(57) ABSTRACT

Techniques for wireless communications are described. Control information used to preschedule communication resources may be received and communications may be performed based on the control information using a pre-scheduling technique. A scheduling type used for the control information may be determined using configuration information, an indication included in the control information, or both. A wireless device that is prescheduled communication resources may not start or not restart an inactivity timer based on the received control information. Also, a wireless device that is prescheduled communication resources may not start a retransmission timer based on the received control information. Additionally, a wireless device that is prescheduled communication resources may also refrain from transmitting a scheduling request based on a duration until a next instance of prescheduled communication resources is expected to occur.

72 Claims, 15 Drawing Sheets

(56) References Cited

U.S. PATENT DOCUMENTS

| | | | |
|---|---|---|---|
| 2020/0178275 A1* | 6/2020 | Shao | H04W 72/23 |
| 2020/0305133 A1 | 9/2020 | Zhou et al. | |
| 2020/0314948 A1* | 10/2020 | Babaei | H04L 1/1819 |
| 2021/0307108 A1* | 9/2021 | Babaei | H04L 1/189 |
| 2022/0046661 A1* | 2/2022 | Jeon | H04W 76/30 |
| 2022/0053529 A1* | 2/2022 | Nimbalker | H04L 5/0053 |

\* cited by examiner

TECHNIQUES FOR SCHEDULING COMMUNICATION RESOURCES

CROSS-REFERENCES

The present Application for Patent claims the benefit of U.S. Provisional Patent Application No. 63/093,065 by Meyland et al., entitled "TECHNIQUES FOR SCHEDULING COMMUNICATION RESOURCES," filed Oct. 16, 2020, assigned to the assignee hereof, and which is hereby incorporated by reference in its entirety.

FIELD OF DISCLOSURE

The following relates to wireless communications, including techniques for scheduling communication resources.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A base station may schedule communication resources (e.g., downlink or uplink resources) for a UE. The base station may indicate to the UE a set of communication resources that have been scheduled for the UE, and the base station and the UE may communicate with one another over the scheduled communication resources.

SUMMARY

Techniques that support techniques for scheduling communication resources are described. Control information used to preschedule communication resources may be received and communications may be performed based on the control information using a prescheduling technique. A scheduling type used for the control information may be determined using configuration information, an indication included in the control information, or both. A wireless device that is prescheduled communication resources may not start or not restart an inactivity timer based on the received control information. Also, a wireless device that is prescheduled communication resources may not start a retransmission timer based on the received control information. Additionally, a wireless device that is prescheduled communication resources may also refrain from transmitting a scheduling request based on a duration until a next instance of prescheduled communication resources is expected to occur.

A method for wireless communications at a user equipment (UE) is described. The method may include receiving control information that schedules a set of uplink resources for the UE in accordance with a prescheduling type, the set of uplink resources being prescheduled in advance of the UE sending one or more requests for uplink resources and communicating using the set of uplink resources based on the control information being associated with the prescheduling type.

An apparatus for wireless communications at a UE is described. The apparatus may include a processor, memory coupled with the processor, and instructions stored in the memory. The instructions may be executable by the processor to cause the apparatus to receive control information that schedules a set of uplink resources for the UE in accordance with a prescheduling type, the set of uplink resources being prescheduled in advance of the UE sending one or more requests for uplink resources and communicate using the set of uplink resources based on the control information being associated with the prescheduling type.

Another apparatus for wireless communications at a UE is described. The apparatus may include means for receiving control information that schedules a set of uplink resources for the UE in accordance with a prescheduling type, the set of uplink resources being prescheduled in advance of the UE sending one or more requests for uplink resources and means for communicating using the set of uplink resources based on the control information being associated with the prescheduling type.

A non-transitory computer-readable medium storing code for wireless communications at a UE is described. The code may include instructions executable by a processor to receive control information that schedules a set of uplink resources for the UE in accordance with a prescheduling type, the set of uplink resources being prescheduled in advance of the UE sending one or more requests for uplink resources and communicate using the set of uplink resources based on the control information being associated with the prescheduling type.

In some examples of the method, apparatuses, and non-transitory computer-readable medium described herein, the control information may be received in a downlink control information message and the method, apparatuses, and non-transitory computer-readable medium may include further operations, features, means, or instructions for decoding the downlink control information message and determining that the prescheduling type may be associated with the control information based on an indicator included in the decoded downlink control information message.

In some examples of the method, apparatuses, and non-transitory computer-readable medium described herein, the control information may be received in a downlink control information message and the method, apparatuses, and non-transitory computer-readable medium may include further operations, features, means, or instructions for identifying an index of a slot, symbol, or resource blocks used for a control channel or a shared channel in which the downlink control information message may be received or an uplink transmission scheduled by the downlink control information message may be performed and determining that the prescheduling type may be associated with the downlink control information message based on the index of the slot, the symbol, or the resource blocks.

In some examples of the method, apparatuses, and non-transitory computer-readable medium described herein, the control information may be received in a downlink control information message and the method, apparatuses, and non-transitory computer-readable medium may include further operations, features, means, or instructions for receiving radio resource control information that indicates a configuration for the prescheduling type, the configuration including a periodicity, offset, a frequency position, or any combination thereof for receiving control information that may be associated with the prescheduling type and determining that the prescheduling type may be associated with the downlink control information message based on the configuration and a position of the downlink control information message in a control channel or a position of the shared channel.

Some examples of the method, apparatuses, and non-transitory computer-readable medium described herein may further include operations, features, means, or instructions for determining a scheduling type of the control information or an uplink transmission and determining, based on the determined scheduling type, whether to start an inactivity timer.

Some examples of the method, apparatuses, and non-transitory computer-readable medium described herein may further include operations, features, means, or instructions for refraining from starting an inactivity timer after receiving the control information based on the control information being associated with the prescheduling type and refraining from restarting the inactivity timer after receiving the control information based on the control information being associated with the prescheduling type.

Some examples of the method, apparatuses, and non-transitory computer-readable medium described herein may further include operations, features, means, or instructions for identifying a discontinuous reception on interval, determining that the control information may be received in a first portion of the discontinuous reception on interval, and refraining from starting or restarting an inactivity timer based on receiving the control information in the first portion of the discontinuous reception on interval.

Some examples of the method, apparatuses, and non-transitory computer-readable medium described herein may further include operations, features, means, or instructions for identifying a discontinuous reception on interval, determining that the control information may be received in a second portion of the discontinuous reception on interval, and starting or restarting an inactivity timer based on receiving the control information in the second portion of the discontinuous reception on interval.

Some examples of the method, apparatuses, and non-transitory computer-readable medium described herein may further include operations, features, means, or instructions for refraining from starting a retransmission timer after receiving the control information based on the control information being associated with the prescheduling type.

Some examples of the method, apparatuses, and non-transitory computer-readable medium described herein may further include operations, features, means, or instructions for refraining from starting a retransmission timer after receiving the control information based on an indicator included in the control information.

Some examples of the method, apparatuses, and non-transitory computer-readable medium described herein may further include operations, features, means, or instructions for refraining from starting a retransmission timer after receiving the control information based on a radio resource control configuration.

Some examples of the method, apparatuses, and non-transitory computer-readable medium described herein may further include operations, features, means, or instructions for identifying a discontinuous reception on interval, determining that the control information may be received in a first portion of the discontinuous reception on interval, and refraining from starting or restarting a retransmission timer based on receiving the control information in the first portion of the discontinuous reception on interval.

Some examples of the method, apparatuses, and non-transitory computer-readable medium described herein may further include operations, features, means, or instructions for identifying a discontinuous reception on interval, determining that the control information may be received in a second portion of the discontinuous reception on interval, and starting or restarting a retransmission timer based on receiving the control information in the second portion of the discontinuous reception on interval.

Some examples of the method, apparatuses, and non-transitory computer-readable medium described herein may further include operations, features, means, or instructions for refraining from transmitting a request for uplink resources based on the set of uplink resources being scheduled by the control information.

Some examples of the method, apparatuses, and non-transitory computer-readable medium described herein may further include operations, features, means, or instructions for determining a first duration associated with transmitting the request for uplink resources and being scheduled the requested uplink resources, determining a second duration until the set of uplink resources may be to be scheduled by the control information, and refraining from transmitting the request for uplink resources based on the second duration being less than the first duration.

Some examples of the method, apparatuses, and non-transitory computer-readable medium described herein may further include operations, features, means, or instructions for determining a duration until a second set of uplink resources may be to be scheduled by second control information of the prescheduling type and refraining from transmitting a request for uplink resources based on the duration being less than a threshold.

In some examples of the method, apparatuses, and non-transitory computer-readable medium described herein, the threshold may be based on a second duration associated with transmitting the request for uplink resources and being scheduled the requested uplink resources.

In some examples of the method, apparatuses, and non-transitory computer-readable medium described herein, the threshold may be based on a quality of service of a set of data at the UE that triggers a scheduling request.

Some examples of the method, apparatuses, and non-transitory computer-readable medium described herein may further include operations, features, means, or instructions for receiving radio resource control information that indicates a configuration for the prescheduling type, the configuration including a periodicity, offset, a frequency position, or any combination thereof for receiving control information that may be associated with the prescheduling type, determining a timing for being scheduled uplink resources in response to a transmitted scheduling request, and determining whether to transmit a scheduling request based on the timing and the configuration for the prescheduling type.

Some examples of the method, apparatuses, and non-transitory computer-readable medium described herein may further include operations, features, means, or instructions for receiving radio resource control information that indicates recurring uplink resource positions configured for the UE and that the prescheduling type may be associated with the recurring uplink resource positions, where receiving the control information includes receiving a medium access control information that indicates one or more uplink resource positions of the recurring uplink resource positions include the set of uplink resources.

Some examples of the method, apparatuses, and non-transitory computer-readable medium described herein may further include operations, features, means, or instructions for determining, from a set of multiple scheduling types, a scheduling type associated with the control information, where the set of multiple scheduling types includes a first prescheduling type that uses downlink control information to dynamically schedule uplink resources in anticipation of the one or more requests for uplink resources, a second prescheduling type that uses radio resource control information to statically indicate recurring uplink resource positions and a medium access control information trigger to dynamically schedule uplink resources using one or more uplink resource positions of recurring uplink resource positions indicated by the second prescheduling type in anticipation of the one or more requests for uplink resources, a third scheduling type that uses downlink control information to dynamically schedule uplink resources after receiving a request for uplink resources, and a fourth scheduling type that uses radio resource control information to statically indicate recurring uplink resource positions and a downlink control information trigger to semi-statically schedule uplink resources in recurring uplink resource positions indicated by the fourth scheduling type.

In some examples of the method, apparatuses, and non-transitory computer-readable medium described herein, the prescheduling type dynamically schedules uplink resources without receiving a request for uplink resources.

A method for wireless communications at a base station is described. The method may include selecting a prescheduling type for scheduling uplink resources for a UE, the prescheduling type being used to preschedule a set of uplink resources for the UE in advance of receiving one or more requests for uplink resources from the UE and transmitting control information that schedules the set of uplink resources for the UE in accordance with the selected prescheduling type, where the selected prescheduling type associated with the control information is indicated based on transmitting the control information.

An apparatus for wireless communications at a base station is described. The apparatus may include a processor, memory coupled with the processor, and instructions stored in the memory. The instructions may be executable by the processor to cause the apparatus to select a prescheduling type for scheduling uplink resources for a UE, the prescheduling type being used to preschedule a set of uplink resources for the UE in advance of receiving one or more requests for uplink resources from the UE and transmit control information that schedules the set of uplink resources for the UE in accordance with the selected prescheduling type, where the selected prescheduling type associated with the control information is indicated based on transmitting the control information.

Another apparatus for wireless communications at a base station is described. The apparatus may include means for selecting a prescheduling type for scheduling uplink resources for a UE, the prescheduling type being used to preschedule a set of uplink resources for the UE in advance of receiving one or more requests for uplink resources from the UE and means for transmitting control information that schedules the set of uplink resources for the UE in accordance with the selected prescheduling type, where the selected prescheduling type associated with the control information is indicated based on transmitting the control information.

A non-transitory computer-readable medium storing code for wireless communications at a base station is described. The code may include instructions executable by a processor to select a prescheduling type for scheduling uplink resources for a UE, the prescheduling type being used to preschedule a set of uplink resources for the UE in advance of receiving one or more requests for uplink resources from the UE and transmit control information that schedules the set of uplink resources for the UE in accordance with the selected prescheduling type, where the selected prescheduling type associated with the control information is indicated based on transmitting the control information.

Some examples of the method, apparatuses, and non-transitory computer-readable medium described herein may further include operations, features, means, or instructions for using the prescheduling type to schedule the set of uplink resources based on the selecting and generating a downlink control information message including an indication that the downlink control information message may be associated with the prescheduling type based on using the prescheduling type, where transmitting the control information includes transmitting the downlink control information message.

Some examples of the method, apparatuses, and non-transitory computer-readable medium described herein may further include operations, features, means, or instructions for using the prescheduling type to schedule the set of uplink resources based on the selecting and generating a downlink control information message based on using the prescheduling type, where transmitting the control information includes transmitting the downlink control information message using a slot index, a symbol index, or a resource block index of a control channel or a shared channel associated with the prescheduling type.

Some examples of the method, apparatuses, and non-transitory computer-readable medium described herein may further include operations, features, means, or instructions for transmitting radio resource control information that indicates a configuration for the prescheduling type, the configuration including a periodicity, offset, a frequency, or any combination thereof for receiving control information that may be associated with the prescheduling type.

Some examples of the method, apparatuses, and non-transitory computer-readable medium described herein may further include operations, features, means, or instructions for transmitting radio resource control information that indicates recurring uplink resource positions configured for the UE and that the prescheduling type may be associated with the recurring uplink resource positions, where transmitting the control information includes transmitting a medium access control information that indicates one or more uplink resource positions of the recurring uplink resource positions include the set of uplink resources.

Some examples of the method, apparatuses, and non-transitory computer-readable medium described herein may further include operations, features, means, or instructions for determining the prescheduling type from a set of multiple scheduling types, the set of multiple scheduling types including a first prescheduling type that uses downlink control information to dynamically schedule uplink resources in anticipation of the one or more requests for uplink resources, a second prescheduling type that uses radio resource control information to statically indicate recurring uplink resource positions and a medium access control information trigger to dynamically schedule uplink resources using one or more uplink resource positions of recurring uplink resource positions indicated by the second prescheduling type in anticipation of the one or more requests for uplink resources, a third scheduling type that uses downlink control information to dynamically schedule uplink resources after receiving a request for uplink resources, and a fourth scheduling type that uses radio resource control information to statically indicate recurring uplink resource positions and a downlink control information trigger to semi-statically schedule uplink resources in recurring uplink resource positions indicated by the fourth scheduling type.

In some examples of the method, apparatuses, and non-transitory computer-readable medium described herein, the control information may be transmitted based on a discontinuous reception cycle configured for the UE.

DETAILED DESCRIPTION

Figure 1:
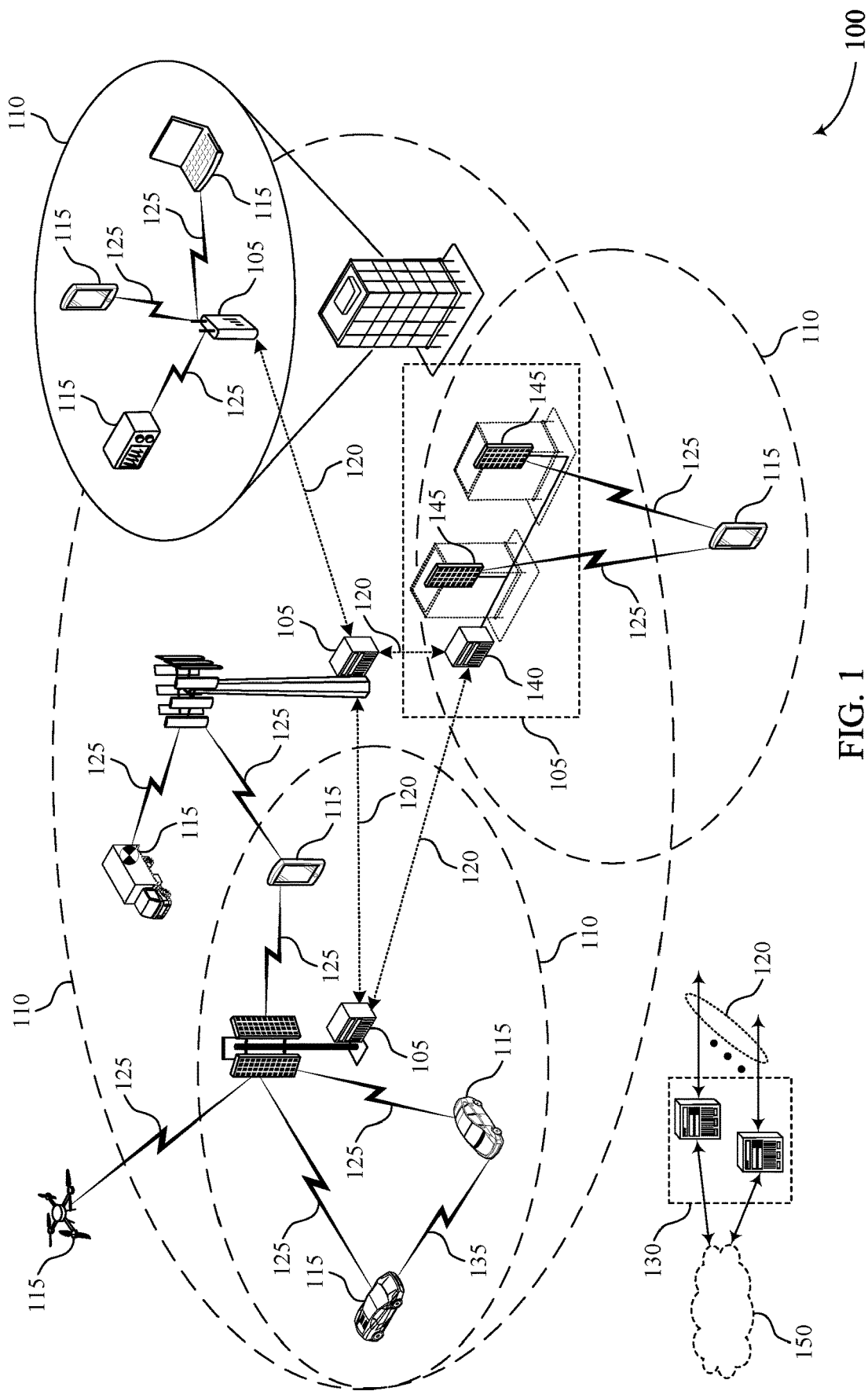
FIG. 1 illustrates an example of a wireless communications system that supports techniques for scheduling communication resources in accordance with various aspects of the present disclosure.

A scheduling device (e.g., a base station) may schedule communication resources for a wireless device to perform communications. In some examples, the base station may dynamically schedule uplink resources for the wireless device after receiving a request from the wireless device for resources by transmitting a scheduling message to the wireless device. In such cases, the base station may be referred to as using a "dynamic scheduling technique." In some examples, the base station may schedule uplink resources in advance of receiving a request from the wireless device by allocating a recurring set of uplink resources to the wireless device. In such cases, the base station may be referred to as using a "semi-static scheduling technique." In some examples, the base station may dynamically schedule uplink resources in advance of receiving a request from the wireless device by transmitting an unsolicited scheduling message to a wireless device that allocates a set of resources to the wireless device. In such cases, the scheduling may be referred to as using a "prescheduling technique."

A wireless device (e.g., a user equipment (UE)) may be configured with a discontinuous reception (DRX) cycle. During a first interval of the DRX cycle (which may be referred to as a "DRX-Off interval"), the wireless device may not be scheduled communication resources and may enter an inactive state. During a second interval (which may be referred to as a "DRX-On interval"), the wireless device may be scheduled communication resources and may enter an active state to search for a scheduling message (which may also be referred to as a "scheduling grant"). In some examples, a wireless device may remain in an active state after an end of a DRX-On interval—e.g., if the wireless device is scheduled communication resources that occur in the subsequent DRX-Off interval. In some examples, the wireless device uses an inactivity timer in combination with an end of the DRX-On interval to determine when to return to the inactive state. In some instances, the wireless device starts an inactivity timer when a scheduling grant is received and remains in the active state until both the DRX-On interval ends and the inactivity timer expires. In some examples, a scheduling device may schedule communication resources in accordance with a DRX cycle configured for the wireless device—e.g., the scheduling device may schedule communication resources (or an initial set of communication resources) that occur within a DRX-On interval.

A wireless device (e.g., a UE) may also be configured to support one or more hybrid automatic repeat request (HARQ) processes. In some examples, a wireless device initiates a retransmission timer after a scheduling grant is received—e.g., after waiting for a HARQ round trip time duration. The wireless device may enter an active state when the retransmission timer is initiated and remain in an active state until the retransmission timer expires—e.g. to receive retransmissions of data. In some examples, the wireless device remains in the active state until the DRX-On interval ends, the inactivity timer expires, and the retransmission timer expires.

In some examples, the wireless device may initiate an inactivity timer and/or a retransmission timer after a scheduling grant associated with a dynamic scheduling technique (which may also be referred to as a "dynamic grant") is received or after a scheduling grant associated with a prescheduling technique (which may also be referred to as a "prescheduling grant") is received. Thus, the receiving device may restart an inactivity timer and/or retransmission timer after a prescheduling grant is received, even if the prescheduling grant only schedules uplink resources that occur during a DRX-on interval configured for the receiving device. Also, the receiving device may be unable to determine when (or if) a next prescheduling grant will be issued by a scheduling device. Thus, the receiving device may send a scheduling request to the scheduling device instead of waiting for a forthcoming prescheduling grant, even if the scheduling request yields uplink resources that occur after uplink resources scheduled by the forthcoming prescheduling grant.

To prevent a receiving device from unnecessarily extending an amount of time the receiving device is in the active state, a scheduling device may indicate that a scheduling message includes a prescheduling grant, and a receiving device may not start (or restart) an inactivity timer after determining that the scheduling message includes a prescheduling grant. Also, to prevent a receiving device from unnecessarily increasing signaling overhead used for uplink scheduling, a scheduling device may indicate a prescheduling grant configuration for the receiving device that indicates when prescheduling grants are scheduled to occur.

In some examples, a receiving device may receive control information that schedules uplink resources for the receiving device. The receiving device may determine a scheduling type (e.g., dynamic, semi-static, prescheduled, etc.) associated with the control information. In some examples, the receiving device determines that the control information includes a prescheduling grant based on an indicator of the scheduling type included in the control information (e.g., in a downlink control information (DCI) message) or in previously and currently received control information (e.g., in a medium access control (MAC) message and a radio resource control (RRC) message). In some examples, the receiving device determines that the control information includes a prescheduling grant based on a format (e.g., a DCI format) used for the control information. In some examples, the receiving device determines that the control information includes a prescheduling grant based on an index of a slot, symbol, or resource block in which the control information is received.

In some examples, the receiving device may perform DRX operations based on determining that the scheduling message includes a prescheduling grant. For instance, the receiving device may refrain from starting or restarting an inactivity timer after receiving the control information based on determining that a scheduling message includes a prescheduling grant. By not starting or continuing to run the inactivity timer, the receiving device may enter the inactive state sooner than if the inactivity timer were started or restarted. Similarly, the receiving device may perform HARQ operations based on determining that a scheduling message includes a prescheduling grant. For instance, the receiving device may refrain from starting a retransmission timer after receiving the control information based on determining that the scheduling message includes a prescheduling grant. By not starting the retransmission timer, the receiving device may avoid entering the active state.

In some examples, a transmitting device may transmit control information to a receiving device that indicates a prescheduling configuration for the receiving device. The control information may indicate a periodicity with which prescheduling grants may be transmitted to the receiving device, an offset for the prescheduling grants, frequency positions, or any combination thereof. The receiving device may use the determined configuration to determine when an upcoming prescheduling grant is to be transmitted, a position of the prescheduling grant within a time interval, a frequency location of the prescheduling grant, or any combination thereof. Before transmitting a scheduling request (SR), a receiving device may determine a duration until a next prescheduling grant is to be transmitted and, in some examples, may refrain from transmitting the SR if the duration is below a threshold. By determining whether to transmit an SR based on determining when a next prescheduling grant is to be transmitted, a receiving device may avoid increasing signaling overhead associated with scheduling uplink transmissions.

Aspects of the disclosure are initially described in the context of wireless communications systems. Aspects of the disclosure are also described in the context of a timing diagram and process flow. Aspects of the disclosure are further illustrated by and described with reference to apparatus diagrams, system diagrams, and flowcharts that relate to techniques for scheduling communication resources.

FIG. 1 illustrates an example of a wireless communications system 100 that supports techniques for scheduling communication resources in accordance with various aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or another network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may allocate a set of uplink resources to a UE 115 and indicate to the UE 115 a position of the set of uplink resources. The UE 115 may use the uplink resources to transmit uplink communications to base station 105. The process of allocating and indicating resources for a UE 115 may also be referred to as scheduling. The base station 105 may use control information (e.g., RRC information, DCI, or both) to schedule a UE 115. In some examples, a UE 115 may request that the base station 105 schedule the UE 115 for an uplink communication. To request to be scheduled, the UE 115 may transmit an SR to the base station 105. The UE 115 may also transmit a buffer status report (BSR) to the base station 105 that indicates an amount of data the UE 115 has to transmit to the base station 105. In some examples, the base station 105 may schedule an amount of uplink resources that is sufficient to support transmission of the amount of data indicated by the UE 115.

In some examples, a base station 105 may dynamically schedule a UE 115 using DCI signaling—e.g., after receiving an SR from the UE 115. In such cases, the base station 105 may transmit a DCI message that indicates a set of uplink resources that are allocated to the UE 115. To schedule the UE 115 a second time, the base station 105 may transmit another DCI message that indicates another set of uplink resources. The other set of uplink resource may use different frequency resources than the first set of uplink resources. In some examples, the base station 105 may continue to send DCI messages scheduling the UE 115 for uplink resources until an amount of data indicated by the UE 115 in a BSR has been transmitted. Dynamically scheduling a UE 115 for uplink communications may prevent the base station 105 from committing uplink resources to the UE 115 that may go unused—that is, the base station 105 may allocate a quantity of uplink resources having a capacity that matches (or nearly matches) a size of data to be transmitted from the UE 115. Signaling used to dynamically schedule uplink resources may be referred to as a dynamic grant. Also, uplink resources that are dynamically scheduled may be referred to as dynamic uplink resources.

In some examples, the base station 105 may semi-statically schedule a UE 115 using a combination of RRC and DCI signaling. In such cases, the base station 105 may transmit an RRC message that indicates uplink resource positions that are configured for the UE 115. For example, the RRC message may indicate a recurring set of uplink resource positions, where uplink resources that occur during the recurring set of uplink resource positions may be allocated to the UE 115 if activated. To activate the semi-static uplink resources, the base station 105 may transmit a single DCI message to the UE 115 that indicates that uplink resources that occur within the recurring set of uplink resource positions are allocated to the UE 115. The UE 115 may determine that uplink resources that correspond to the recurring set of uplink resource positions are allocated to the UE 115 for an indeterminate amount of time (e.g., until a DCI message deactivating the semi-static uplink resources is received), whereas uplink resources that are dynamically scheduled by a DCI message may be determinate. Semi-static scheduling may result in a preemptive scheduling of the UE 115 based on an expected uplink activity of the UE 115. Preemptively scheduling a UE 115 for uplink communications may reduce (relative to dynamic scheduling) a quantity of SRs sent from the UE 115 to the base station 105, reducing a signaling overhead associated with uplink scheduling. Signaling used to semi-statically schedule uplink resources may be referred to as a configured grant. Also, uplink resources that are semi-statically scheduled may be referred to as semi-static uplink resources.

In some examples, the base station 105 may dynamically and preemptively schedule a UE 115 using DCI signaling. In such cases, the base station 105 may transmit a DCI message that schedules a set of uplink resources for the UE 115. The base station 105 may transmit the DCI message without knowing or receiving an indication that the UE 115 has data but in anticipation that the UE 115 has data to send to the base station 105. A size of the set of uplink resources scheduled by the base station 105 may be based on an estimate of an amount of data the UE 115 has to send to the base station 105. Signaling used to dynamically and preemptively schedule uplink resources may be referred to as a prescheduling grant. The prescheduling grant may provide the benefits of a configured grant (e.g., reduce signaling overhead for uplink scheduling) without the detriments of a configured grant (e.g., the commitment of resources). Also, uplink resources that are dynamically and preemptively scheduled may be referred to as prescheduling resources.

A wireless communications system 100 may support techniques for conserving energy at a UE 115. In some examples, the wireless communications system 100 may use discontinuous scheduling techniques that enable a UE 115 to enter an inactive (or sleep state) during predetermined intervals during which a base station 105 is precluded from scheduling communication resources for the UE 115. In some examples, a UE 115 may be configured with a DRX cycle that has a first interval (which may be referred to as DRX-Off) during which (initial) communication resources may not to be scheduled for the UE 115 and the UE 115 enters an inactive state. The DRX cycle may also have a second interval (which may be referred to as DRX-On) during which (initial) communication resources may be scheduled for the UE 115 and the UE 115 enters an active state. During the DRX-On interval, the UE 115 may monitor control resources (e.g., physical downlink control channel (PDCCH) resources) for a DCI message that is intended for the UE 115.

In some examples, the UE 115 may use an inactivity timer (which may be referred to as drx-InactivityTimer) to remain in the active state after an end of the DRX-On interval—e.g., to support downlink and/or uplink communications that extend longer than the DRX-On interval. In such cases, the UE 115 may start an inactivity timer after a DCI message is received and may restart the inactivity timer if a subsequent DCI message is received before the inactivity expires or an end of the DRX-On interval. In some examples, after the inactivity timer is started or restarted, an expiration of the inactivity timer may occur after an end of the DRX-On interval, and the UE 115 may remain in the active state until both the DRX-On interval has ended and the inactivity timer has expired. In some examples, the UE 115 may restart an inactivity timer each time a DCI message is received (assuming the DCI messages are not separated by a duration that exceeds a length of the inactivity timer), thus, remaining in an active state until an occurrence of a last scheduled communication resource.

In some examples, when semi-static scheduling is used, a base station 105 may semi-statically schedule recurring communication resources for the UE 115 that fall within the DRX-On interval without transmitting any DCI messages. Thus, the UE 115 may use the semi-statically communication resources without starting or restarting an inactivity timer. When dynamic scheduling is used, a base station 105 may dynamically schedule sets of communication resources using corresponding DCI messages and may schedule communication resources that occur in the DRX-Off interval to support an amount of data to be transmitted to/from a UE 115. Similarly, when prescheduling is used, a base station 105 may dynamically schedule sets of communication resources using corresponding DCI message(s). However, in some examples, the base station 105 may avoid prescheduling communication resources that occur within the DRX-off interval—that is, the base station may solely preschedule communication resources that occur within the DRX-on interval.

A wireless communications system may also support techniques for improving a reliability of communications between wireless devices (e.g., a base station 105 and a UE 115), such as a HARQ technique. In some examples, a wireless device (e.g., UE 115) may start a HARQ retransmission timer (which may be referred to as drx-RetransmissionTimerUL) after performing an uplink transmission scheduled by a scheduling grant. In some examples, the wireless device may start the HARQ retransmission timer after a HARQ round trip time duration (which may be referred to as drx-HARQ-RTT-TimerUL), starting with the end of an uplink transmission scheduled by the scheduling grant, has expired (e.g., has reached a threshold value). After starting the HARQ retransmission timer, the UE 115 may enter an active state until the HARQ retransmission timer expires. A base station 105 may schedule retransmissions while the UE 115 is in the active state. In some examples, additional HARQ retransmissions may be of minimal benefit—e.g., when the additional HARQ retransmissions are incompatible with a latency requirement for a data packet. In some examples, additional HARQ retransmissions may be beneficial—e.g., when a data packet has a relaxed latency requirement.

In some examples, the wireless device may initiate an inactivity timer and/or a retransmission timer after a dynamic grant is received or after a prescheduling grant is received—e.g., based on being unable to distinguish between a dynamic grant and a prescheduling grant. Thus, the receiving device may restart an inactivity timer and/or retransmission timer after a prescheduling grant is received, even if the prescheduling grant only schedules uplink resources that occur during a DRX-on interval configured for the receiving device—unnecessarily extending an amount of time the receiving device operates in the active state. Also, the receiving device may be unable to determine when (or if) a next prescheduling grant will be issued by a scheduling device. Thus, the receiving device may send a scheduling request to the scheduling device instead of waiting for a forthcoming prescheduling grant, even if the scheduling request yields uplink resources that occur after uplink resources scheduled by the forthcoming prescheduling grant—increasing a signaling overhead used for uplink scheduling and decreasing resource utilization for the system.

To prevent a receiving device from unnecessarily extending an amount of time the receiving device is in the active state, a scheduling device may indicate that a scheduling message includes (or is) a prescheduling grant, and a receiving device may not start (or restart) an inactivity timer after determining that the scheduling message includes (or is) a prescheduling grant. Also, to prevent a receiving device from unnecessarily increasing signaling overhead used for uplink scheduling, a scheduling device may indicate a prescheduling grant configuration for the receiving device that indicates when prescheduling grants are scheduled to occur.

In some examples, a receiving device may receive control information (e.g., RRC information, DCI, or a combination thereof) that schedules uplink resources for the receiving device. The receiving device may determine a scheduling type (e.g., dynamic, semi-static, prescheduled, etc.) associated with the control information. In some examples, the receiving device determines that the control information includes (or is) a prescheduling grant based on an indicator of the scheduling type included in the control information (e.g., in a DCI message) or in previously and currently received control information (e.g., in a MAC message and an RRC message). In some examples, the receiving device determines that the control information includes (or is) a prescheduling grant based on a format (e.g., a DCI format) used for the control information. In some examples, the receiving device determines that the control information includes (or is) a prescheduling grant based on an index of a slot, symbol, or resource block in which the control information is received.

In some examples, the receiving device may perform DRX operations based on determining that the scheduling message includes (or is) a prescheduling grant. For instance, the receiving device may refrain from starting or restarting an inactivity timer after receiving the control information based on determining that a scheduling message includes (or is) a prescheduling grant. By not starting or continuing to run the inactivity timer, the receiving device may enter the inactive state sooner than if the inactivity timer were started or restarted. Similarly, the receiving device may perform HARQ operations based on determining that a scheduling message includes (or is) a prescheduling grant. For instance, the receiving device may refrain from starting a retransmission timer after receiving the control information based on determining that the scheduling message includes (or is) a prescheduling grant. By not starting the retransmission timer, the receiving device may avoid entering the active state.

In some examples, a transmitting device may transmit control information to a receiving device that indicates a prescheduling configuration for the receiving device. The control information may indicate a periodicity with which prescheduling grants may be transmitted to the receiving device, an offset for the prescheduling grants, frequency positions, or any combination thereof. The receiving device may use the determined configuration to determine when an upcoming prescheduling grant is to be transmitted, a position of the prescheduling grant within a time interval, a frequency location of the prescheduling grant, or any combination thereof. Before transmitting an SR, a receiving device may determine a duration until a next prescheduling grant is to be transmitted and, in some examples, may refrain from transmitting the SR if the duration is below a threshold. By determining whether to transmit an SR based on determining when a next prescheduling grant is to be transmitted, a receiving device may avoid increasing signaling overhead associated with scheduling uplink transmissions.

Figure 2:
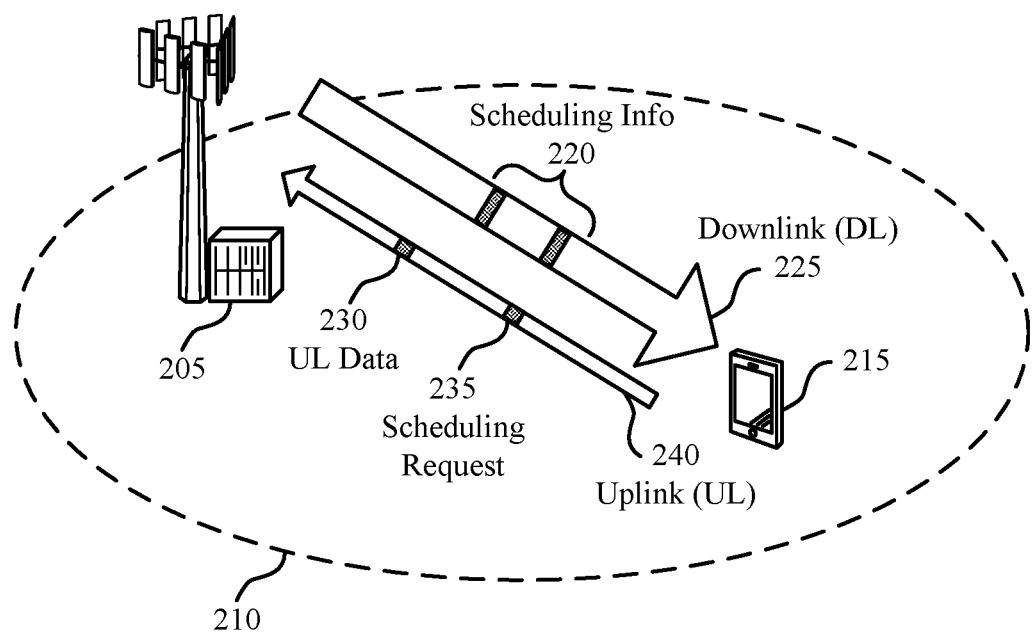
FIG. 2 illustrates an example of a wireless communications subsystem that supports techniques for scheduling communication resources in accordance with various aspects of the present disclosure.

FIG. 2 illustrates an example of a wireless communications subsystem that supports techniques for scheduling communication resources in accordance with various aspects of the present disclosure.

Wireless communications subsystem 200 may be an example of aspects of wireless communications system 100 and may include base station 205 and UE 215. Base station 205 and UE 215 may be examples of a base station and a UE described in FIG. 1, respectively. Base station 205 and UE 215 may communicate with one another within coverage area 210 as described in FIG. 1.

In some examples, base station 205 may configure a DRX cycle for UE 215 that configures a DRX-Off and a DRX-On interval for UE 215. Base station 205 may refrain from scheduling (initial) communication resources for UE 215 during the DRX-Off interval and may schedule (initial) communication resources for UE 215 during the DRX-On interval. Thus, UE 215 may enter an inactive state during the DRX-Off interval and an active state during the DRX-On interval to search for scheduling message. In some examples, UE 215 may remain in the active state after the DRX-On interval ends if an inactivity timer has not expired. Base station 205 may also configure one or more HARQ processes for UE 215 that support retransmissions of data.

Base station 205 may also indicate a length of a HARQ retransmission timer to UE 215 that indicates a period during which retransmissions of a data packet may be sent. In some examples, UE 215 may remain in the active state after the DRX-On interval ends and/or the inactivity timer expires if a HARQ retransmission timer has not expired.

In some examples, base station 205 may transmit scheduling information 220 to UE 215 via downlink 225. Scheduling information 220 may be used to dynamically or semi-statically schedule uplink resources for UE 215. Scheduling information 220 may also be used to dynamically and preemptively schedule uplink resources for UE 215. In some examples, RRC signaling, DCI signaling, or any combination thereof may be used to communicate scheduling information 220 to UE 215. Scheduling information 220 may also include configuration information for one or more scheduling types (which may also be referred to as scheduling schemes, scheduling modes, or scheduling configurations). For example, scheduling information 220 may indicate a set of uplink resource positions (in time) configured for UE 215 (e.g., by indicating periodicity and offset parameters for the uplink resource positions) that may be activated by a DCI trigger—e.g., if a semi-static scheduling type is used. In some examples, the prescheduling information represents times at which the network is planning (with a high likelihood) to provide an opportunity for an uplink transmission, regardless of a prior request in a scheduling request transmitted from UE 215 for uplink resources. In some examples, scheduling information 220 may indicate a set of downlink control resource positions (e.g., by indicating periodicity, offset parameters, frequency position, symbol index, slot index, resource block index, or any combination thereof for the downlink control resource positions) configured for UE 215 to receive a prescheduling grant—e.g., if a prescheduled scheduling type is used. A prescheduling grant may be or include control information that is used to preemptively schedule uplink resources for a UE (e.g., without receiving a scheduling request from the UE, based on determining that the UE likely has data to transmit, etc. Scheduling information 220 may also indicate an indication of a scheduling type (e.g., dynamic, semi-static, or prescheduling) that is associated with a scheduling grant received at UE 215.

In some examples, UE 215 determines whether scheduling information 220 is being used to dynamically, semi-statically, or dynamically and preemptively schedule uplink resources for UE 215. In some examples, UE 215 determines the scheduling type associated with received control information based on an indication included in the received or previous control information, a format used for the control information, a type of the control information, an index of a slot, symbol, or resource block in which the control information is received, and the like.

UE 215 may change its behavior based on whether the scheduling information is of the dynamic, semi-static, or prescheduling type. For example, UE 215 may refrain from starting or restarting an inactivity timer after performing an uplink transmission using pre-scheduled uplink resources—e.g., based on performing the uplink transmission at a time indicated by a prescheduling grant. In some examples, UE 215 may refrain from starting or restarting the inactivity timer after receiving a DCI message if the DCI message is being used to preschedule uplink resources for UE 215. By refraining from starting or restarting the inactivity timer, UE 215 may enter an inactive state earlier than if the inactivity timer had been started or restarted, conserving energy at UE 215. Similarly, UE 215 may refrain from starting a HARQ retransmission timer after receiving a DCI message if the DCI message is being used to preschedule uplink resources for UE 215. By refraining from starting the HARQ retransmission timer, UE 215 may avoid entering the active state, conserving energy at UE 215.

UE 215 may also determine whether to transmit an SR based on configuration information received for a prescheduling type. For example, after data is generated at UE 215 (e.g., uplink data 230) and an SR is triggered, UE 215 may determine when a next prescheduling grant is to be received—e.g., based on the periodicity and offset information received from base station 205. If UE 215 determines that the next prescheduling grant is scheduled to be received within a threshold duration of the grant that would be obtained via the SR, UE 215 may refrain from transmitting the SR and instead wait for the prescheduling grant to transmit uplink data 230 via uplink 240. If the next prescheduling grant is scheduled to be received after an end of the threshold duration, UE 215 may transmit scheduling request 235 to base station 205 via uplink 240 to obtain uplink resources for transmitting uplink data 230. By waiting for the prescheduling grant, UE 215 may reduce overhead signaling used to obtain uplink resources from base station 205, may avoid the issuance of unnecessary uplink resources, and may enable UE 215 to transmit uplink data 230 more quickly than if UE 215 used uplink resources obtained using scheduling request 235.

Figure 3:
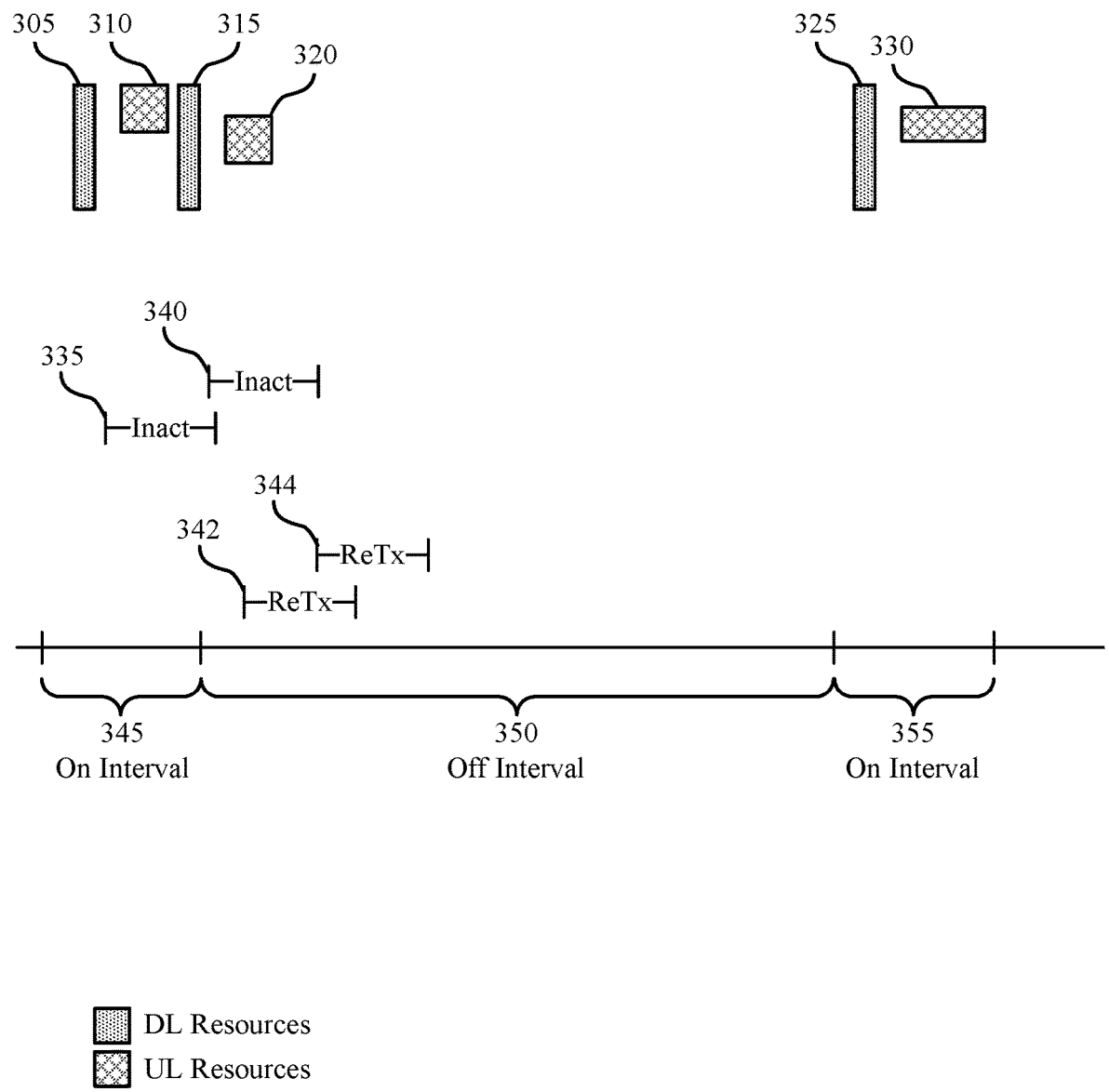
FIG. 3 illustrates an example of a timing diagram that supports techniques for scheduling communication resources in accordance with various aspects of the present disclosure.

FIG. 3 illustrates an example of a timing diagram that supports techniques for scheduling communication resources in accordance with various aspects of the present disclosure. Timing diagram 300 may depict the communication of control and data signals over wireless communication resources with reference to a configured DRX cycle and/or HARQ process.

In some examples, a receiving device (e.g., a UE) is configured with a DRX cycle having a periodic on interval that is interspersed with a periodic off interval. During the on interval, the receiving device may be in an active state in which the receiving device is actively listening for signals transmitted from another device (e.g., a base station). During the off interval, the receiving device may be in an inactive state in which the receiving device may disable circuitry used to receive signals. The receiving device may be capable of remaining in the active state during a beginning of an off interval if an inactivity timer at the receiving device has not expired.

In some examples, the receiving device receives a control message in first downlink resource 305 during first on interval 345. First downlink resource 305 may be a downlink control channel resource (e.g., PDCCH resources). The control message may be a DCI message that is associated with a dynamic scheduling type (or a dynamic grant) and that was transmitted in response to an SR from the receiving device. The control message may also indicate that first uplink resource 310 is scheduled for the receiving device. First uplink resource 310 may be uplink control resources (e.g., physical uplink control channel (PUCCH) resources) and/or uplink data resources (e.g., physical uplink shared channel (PUSCH) resources). In some examples, the control message may also schedule downlink data resources (e.g., physical downlink shared channel (PDSCH) resources). The receiving device may determine that the DCI message includes (or is) a dynamic grant and may initiate an inactivity timer at first time 335. The inactivity timer may not be set to expire until after an end of first on interval 345. Also, at third time 342, the receiving device may initiate a retransmission timer associated with a first HARQ process.

In some examples, the receiving device may initiate the retransmission timer after transmitting an uplink transmission during resources scheduled by the DCI message. In some examples, the receiving device may wait to initiate the retransmission timer after waiting for a HARQ round trip time. The receiving device may enter an active state while the retransmission timer is active. The retransmission timer may be initiated after an end of first on interval 345.

The receiving device may receive a second control message in second downlink resource 315. The second control message may similarly be a DCI message that is associated with a dynamic scheduling type and may indicate that second uplink resource 320 is scheduled for the receiving device. The second control message may be transmitted to schedule the additional uplink resources based on a BSR received from the receiving device. The receiving device may determine that the second DCI message includes (or is) a dynamic grant and may re-initiate (or restart) the inactivity timer at second time 340. In some examples, second control message is the last control message of multiple control messages transmitted to the receiving device, and the receiving device may enter the inactive state at an expiration of the inactivity timer within off interval 350. Also, at fourth time 344, the receiving device may initiate a second retransmission timer associated with a first HARQ process. In some examples, the receiving device may wait to initiate the second retransmission timer until after a round trip time expires. The second retransmission timer may be initiated after an end of first on interval 345.

In some examples, the receiving device receives a third control message in third downlink resource 325. The third control message may be a DCI message that is associated with a prescheduling type and may have been preemptively transmitted by the scheduling device in anticipation of a need for uplink resources at the receiving device—e.g., based on determining that the receiving device likely has data to transmit to the scheduling device. The control message may also indicate that third uplink resource 330 is scheduled for the receiving device. In some examples, the third uplink resource 330 occurs entirely within second on interval 355. In some examples, the receiving device receives multiple control message in second on interval 355 that are each of a prescheduling type. Techniques used by the receiving device to determine that the third control message includes (or is) a prescheduling grant are described in more detail herein and with reference to FIG. 4.

Based on determining that the third control message includes (or is) a prescheduling grant, or based on determining the uplink transmission is of a prescheduled type, the receiving device may refrain from initiating the inactivity timer. Similarly, the receiving device may refrain from initiating a retransmission timer. Thus, the receiving device may return to the inactive state at an end of second on interval 355. Also, the receiving device may not return to the active state during a retransmission interval. By not initiating the inactivity, the receiving device may return to the inactive state more quickly than if the inactivity had been started when the third control message was received. By not initiating the retransmission timer, the receiving device may avoid entering the active state during a retransmission interval relative to if the retransmission timer had been started after performing an uplink transmission scheduled by the third control message.

In some examples, the receiving device may receive a dynamic grant before or concurrently with receiving a prescheduling grant. In such cases, the receiving device may initiate the inactivity when the dynamic grant is received and refrain from restarting the inactivity timer (or continue to run the inactivity timer) when the prescheduling grant is received. Also, the receiving device may initiate a retransmission timer after performing a transmission scheduled by the dynamic grant and refrain from initiating another retransmission timer after performing a retransmission scheduled by the prescheduling grant. By not restarting the inactivity timer, the receiving device may return to the inactive state more quickly than if the inactivity timer had been restarted. By not starting the second retransmission timer, the receiving device may avoid reentering the active state.

In some examples, the receiving device may receive a prescheduling grant before receiving a dynamic grant. In such cases, the receiving device may not initiate the inactivity timer and/or a retransmission timer until the dynamic grant is received. By starting the inactivity timer when the dynamic grant is received, the receiving device may remain in the active state to ensure that the receiving device receives downlink data scheduled by the dynamic grant and/or utilizes any uplink control resources scheduled by the dynamic grant. Similarly, by starting a retransmission timer when the second control message is received, the receiving device may enter the active state during a retransmission interval to ensure that retransmissions of a data packet are received. This operation may enable the prescheduling and dynamic scheduling types to be cooperatively used to schedule a sufficient amount of resources for the receiving device while ensuring that the receiving device remains in the active state for a sufficient amount of time.

In some examples, when a prescheduling grant is received, the receiving device may determine whether to start or restart the inactivity timer and/or to start a retransmission timer based on when, within an on interval, the prescheduling grant is received. In some examples, the receiving device may not start (or restart) the inactivity timer and/or not start a retransmission timer based on receiving the prescheduling grant in a first portion of an on interval (e.g., a first third of an on interval or a first half of an on interval). And the receiving device may start (or restart) the inactivity timer and/or start a retransmission timer based on receiving the prescheduling grant in a second portion of an interval (e.g., a second half of an on interval or last third of an on interval)—in such cases, the prescheduling grant may (or may be more likely to) schedule communication resources that occur in a subsequent off interval.

Figure 4:
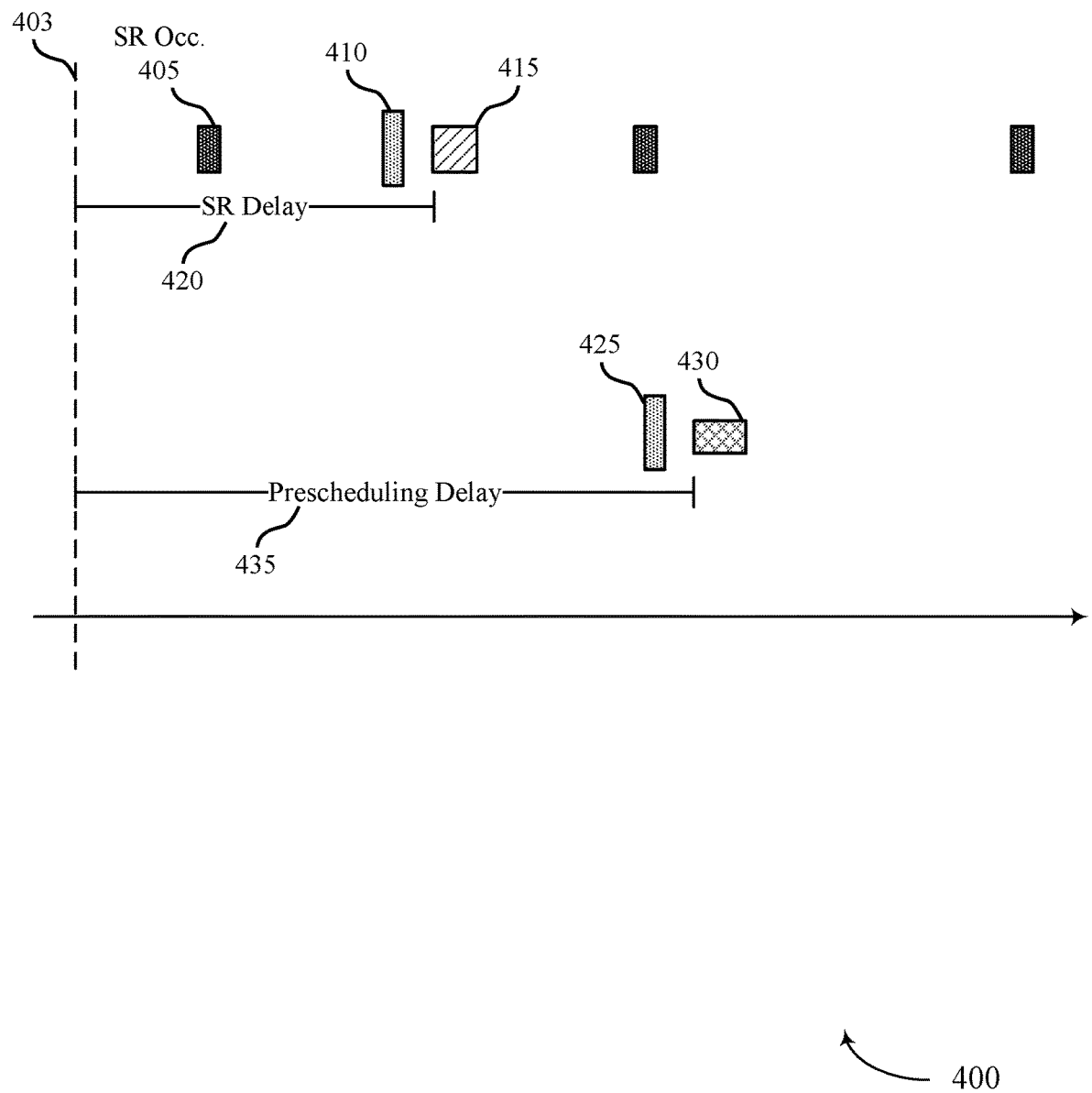
FIG. 4 illustrates an example timing diagrams that supports techniques for scheduling communication resources in accordance with various aspects of the present disclosure.

FIG. 4 illustrates an example of a timing diagram that supports techniques for scheduling communication resources in accordance with various aspects of the present disclosure. Timing diagram 400 may depict a position of uplink resources that may potentially be scheduled by an SR relative to a position of uplink resources that may be scheduled by a periodic prescheduling grant.

In some examples, at time 403, an event that triggers the transmission of an SR may occur at a UE—e.g., the arrival of uplink data or a threshold associated with data generated at the UE for transmission to a base station may be exceeded. After the event occurs, the UE may determine whether to transmit a scheduling request using an SR resource that occurs in an upcoming SR occasion, such as SR occasion 405, to obtain a grant of uplink resources or to wait until prescheduled uplink resources are scheduled to occur. In some examples, SR occasions are configured to occur periodically for the UE. Thus, the UE may determine a duration between time 403 and an occurrence of SR occasion 405 (the duration may be referred to as an SR occasion delay). The UE may also determine a second duration between the occurrence of the SR occasion 405 and an occurrence of control resources (e.g., PDCCH resources) to be scheduled in response to an SR transmitted in SR occasion 405, such as SR control resource 410 (the second duration may be referred to as an SR occasion to PDCCH delay). Additionally, the UE may determine a third duration between the occurrence of SR control resource 410 and uplink data resources (e.g., PUSCH resources) to be scheduled by downlink control information included in SR control resource 410, such as SR uplink resource 415 (the third duration may be referred to as the PDCCH to PUSCH delay). Additionally, or alternatively, the UE may determine an SR to PUSCH delay that indicates a fourth duration between SR occasion 405 and SR uplink resource 415.

In some examples, the UE determines the SR occasion to PDCCH delay, the PDCCH to PUSCH delay, and/or the SR occasion to PUSCH delay based on past measurements or a resource configuration for the UE. The UE may use the determined durations to predict SR delay 420, which may indicate a duration between the occurrence of the event that triggers an SR and a grant of uplink resources. The UE may similarly determine a duration between the occurrence of the event that triggers the SR and a grant of prescheduled uplink resources, such as prescheduling uplink resource 430. In some examples, the UE may determine a first duration between the occurrence of the SR trigger event and an occurrence of control resources, such as prescheduling control resource 425. In some examples, the UE may determine a second duration between the occurrence of prescheduling control resource 425 and uplink data resources, such as prescheduling uplink resource 430—e.g., based on past measurements, configuration information, etc.). The UE may use the determined durations to predict prescheduling delay 435. The threshold may depend on the quality of service (QoS) of the traffic that triggered a scheduling request. For example, for real-time traffic, the threshold may be smaller than for delay-tolerant traffic. By basing the threshold on the QoS of traffic, a wireless communication system may balance power and latency considerations with a scheduling request resource load.

In some examples, the UE compares a length of SR delay 420 with a length of prescheduling delay 435 to determine whether to transmit an SR in SR occasion 405 or to refrain from transmitting an SR in SR occasion 405. If the UE refrains from transmitting the SR, the UE may wait until prescheduling uplink resource 430 are scheduled to transmit uplink data that triggered the SR event at time 403. In some examples, the UE may transmit an SR in SR occasion 405 based on determining that a difference between prescheduling delay 435 and SR delay 420 exceeds a threshold. In some examples, the UE may transmit an SR in SR occasion 405 based on determining that a difference between a duration between time 403 and SR control resource 410 and a duration between time 403 and prescheduling control resource 425 exceeds a threshold.

In some examples, the UE may refrain from transmitting an SR in SR occasion 405 based on determining that a difference between prescheduling delay 435 and SR delay 420 is below a threshold. In some examples, the UE may refrain from transmitting an SR in SR occasion 405 after determining that the difference is below the threshold even when an SR uplink resource occurs prior to a prescheduling uplink resource. In some examples, the UE may transmit an SR in SR occasion 405 based on determining that a difference between a duration between time 403 and SR control resource 410 and a duration between time 403 and prescheduling control resource 425 is below a threshold.

Figure 5:
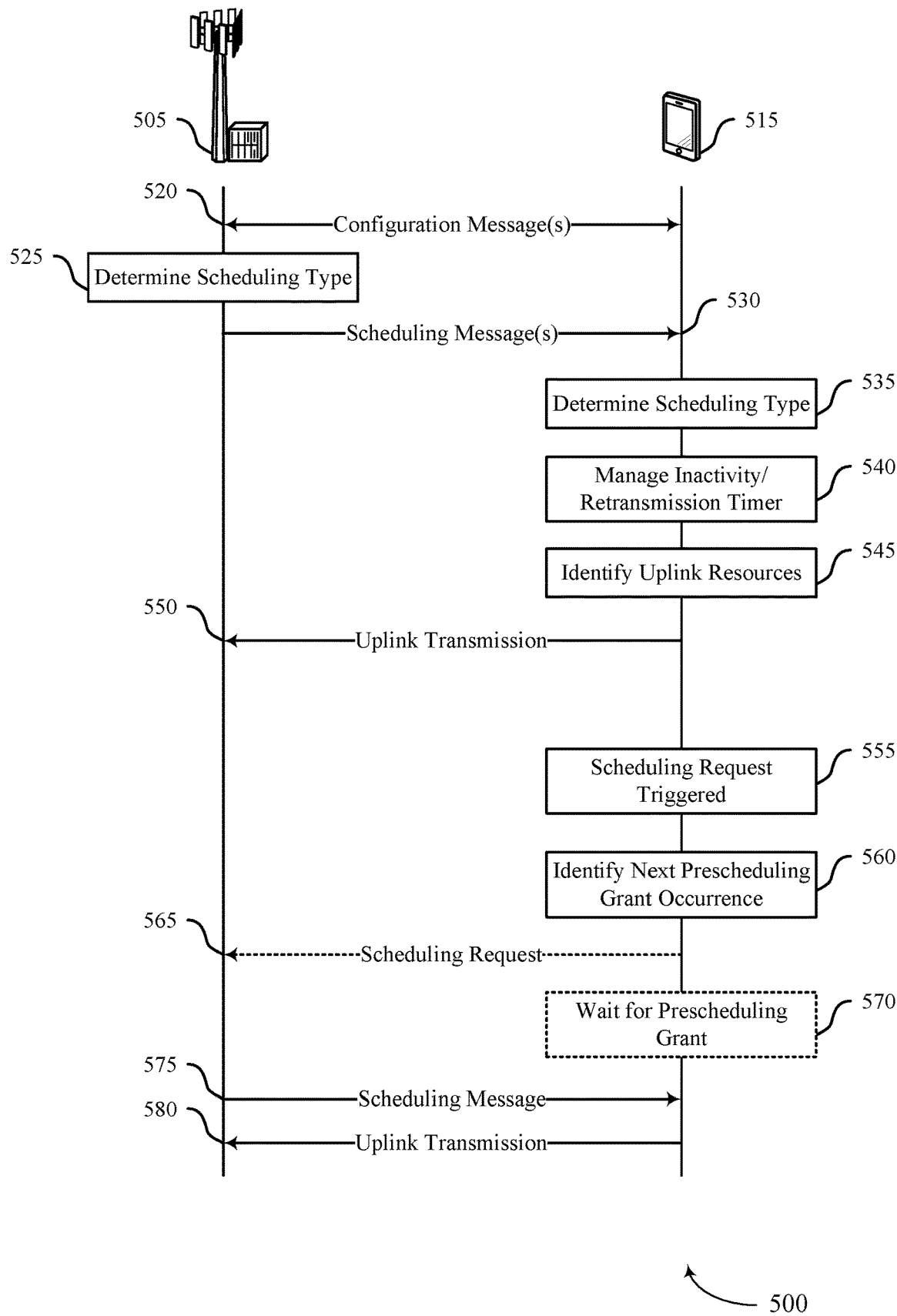
FIG. 5 illustrates an example of a process flow that supports techniques for scheduling communication resources in accordance with various aspects of the present disclosure.

FIG. 5 illustrates an example of a process flow that supports techniques for scheduling communication resources in accordance with various aspects of the present disclosure.

Process flow 500 may be performed by base station 505 and UE 515, which may be examples of a base station or UE described above with reference to FIGS. 1 and 2. In some examples, process flow 500 illustrates an exemplary sequence of operations performed to support scheduling communication resources. For example, process flow 500 depicts operations for determining a scheduling type for a scheduling message and communicating based on the determined scheduling type.

It is understood that one or more of the operations described in process flow 500 may be performed earlier or later in the process, omitted, replaced, supplemented, or performed in combination with another operation. Also, additional operations described herein that are not included in process flow 500 may be included.

At arrow 520, base station 505 and UE 515 may exchange control messages (e.g., RRC messages or MAC control element) that include configuration information for communications between base station 505 and UE 515. In some examples, base station 505 may indicate that a prescheduling type is enabled for scheduling communication resources for UE 515. In some examples, base station 505 may further indicate configuration details for the prescheduling type. For example, base station 505 may indicate a periodicity with which prescheduling grants will be transmitted to UE 515. Base station 505 may also indicate an offset for prescheduling grants to indicate an offset for transmitting the prescheduling grants. UE 515 may use the periodicity and offset to identify a starting slot for prescheduling grants and a time between prescheduling grants. In some examples, base station 505 may indicate that scheduling grants received in particular slots (e.g., in a second slot of an interval) are associated with prescheduling.

In some examples, base station 505 transmits an RRC message used to configure uplink resource positions that may be semi-statically scheduled for UE 515. The RRC message may include a periodicity and offset for the uplink resource positions. The RRC message may also include an indicator that indicates that the uplink resource positions are to be used for prescheduling instead of semi-static scheduling. In such cases, a subset of the uplink resource positions may be activated for prescheduling using a control information trigger (e.g., a MAC-CE).

In some examples, base station 505 transmits an RRC message used to configure a length of a retransmission timer for transmissions that are prescheduled that is different than a length of a retransmission timer for transmissions that are dynamically scheduled. The retransmission timer associated with prescheduling may be referred to as drx-RetransmissionTimerULPSG. In some examples, a duration of the prescheduling retransmission timer may be shorter than a duration of the dynamic retransmission timer. Similarly, base station 505 may transmit an RRC message used to configure a length of a prescheduling inactivity timer that is different than a length of a dynamic inactivity timer. The prescheduling inactivity timer may be referred to as drx-InactivityTimerPSG. In some examples, a duration of the prescheduling inactivity timer may be shorter than a duration of the dynamic inactivity timer.

At block 525, base station 505 may determine a scheduling type to use for scheduling uplink control resources for UE 515. In some examples, base station 505 selects a prescheduling type, a dynamic scheduling type, a semi-static scheduling type, or any combination thereof.

At arrow 530, base station 505 may transmit one or more scheduling message to UE 515. In some examples, one or more of the scheduling messages are DCI messages. In some examples, one or more of the scheduling messages are MAC-CEs. Also, one or more of the scheduling messages may be associated with a dynamic scheduling type (may be dynamic grants) and one or more of the scheduling messages may be associated with a prescheduling type (may be prescheduling grants). In some examples, base station 505 transmits DCI messages associated with the dynamic scheduling type after receiving an SR and, in some examples, a BSR from UE 515. In some examples, base station 505 transmits scheduling messages associated with the prescheduling type based on a prescheduling periodicity configured for UE 515.

In some examples, if a prescheduling message schedules uplink resources that occur during a DRX-Off interval configured for UE 515, base station 505 may also transmit one or more dynamic scheduling messages with, before or after the prescheduling message to trigger an inactivity timer at UE 515. In some examples, the one or more dynamic scheduling messages may not schedule any resources for UE 515.

At block 535, UE 515 may determine a scheduling type associated with one or more scheduling messages received at UE 515. In some examples, UE 515 determines that a received scheduling message is of the prescheduling type based at least in part on an indication included in the scheduling message—e.g., based on an indicator included in a DCI message. In some examples, UE 515 determines that a received scheduling message is of the prescheduling type based at least in part on a format used for the scheduling message—e.g., based on the DCI format used for a DCI message. In some examples, UE 515 determines that the received scheduling message is of the prescheduling type based at least in part on an index of a slot in which the scheduling message is received—e.g., if the scheduling message is received in a second slot of a frame and/or during a first portion of a DRX-ON interval.

At block 540, UE 515 may manage an inactivity timer based on the scheduling type determined for a received scheduling message. In some examples, after determining that a received DCI message includes (or is) a dynamic grant, UE 515 may initiate (or restart) an inactivity timer and monitor for additional DCI messages until the inactivity timer expires.

In some examples, after determining that a received DCI message includes (or is) a prescheduling grant, UE 515 may refrain from initiating an inactivity timer. In some examples, after determining that a received DCI message includes (or is) a prescheduling grant, UE 515 may initiate a prescheduling inactivity timer, which may have a shorter duration than a dynamic inactivity timer. If the inactivity timer has already been initiated, UE 515 may continue to run the inactivity timer (or not restart the inactivity timer) after receiving a prescheduling grant. In some examples, if the inactivity timer has already been initiated, UE 515 may continue to run a dynamic inactivity timer and start (or restart) a prescheduling inactivity timer after receiving a prescheduling grant.

In some examples, after receiving a MAC-CE, UE 515 may refrain from initiating an inactivity timer. In some examples, after receiving a MAC-CE, UE 515 may initiate a prescheduling inactivity timer. If the inactivity timer has already been initiated, UE 515 may continue to run the inactivity timer (or not restart the inactivity timer) after receiving a prescheduling grant. In some examples, if the inactivity timer has already been initiated, UE 515 may continue to run a dynamic inactivity timer and start (or restart) a prescheduling inactivity timer after receiving a prescheduling grant.

In some examples, UE 515 may refrain from initiating or restarting the inactivity timer based on determining that the prescheduling grant is received in a first portion of a DRX-on duration (e.g., a first third of a DRX-on duration, a first half of a DRX-on duration, or a second third of a DRX-on duration). In some examples, UE 515 may initiate or restart the inactivity timer based on determining that the prescheduling grant is received in a second portion of a DRX-on duration (e.g., second third of a DRX-on duration, a last third of a DRX-on duration, a second half of a DRX-on duration). In some examples, UE 515 may initiate or restart the prescheduling inactivity timer based on determining that the prescheduling grant is received in a second portion of a DRX-on duration (e.g., a second third of a DRX-on duration, a second half of a DRX-on duration, or a last third of a DRX-on duration).

UE 515 may also manage a HARQ round trip timer and/or HARQ retransmission timer based on the scheduling type determined for the received scheduling message. In some examples, after determining that a received DCI message includes (or is) a dynamic grant, UE 515 may initiate a retransmission timer and monitor for retransmission until the retransmission timer expires.

In some examples, after determining that a received DCI message includes (or is) a prescheduling grant, UE 515 may refrain from initiating a round trip timer and/or retransmission timer. In some examples, after determining that a received DCI message includes (or is) a prescheduling grant, UE 515 may refrain from initiating a retransmission timer based on receiving a DCI message including an indication that instructs UE 515 to not initiate a retransmission timer for a prescheduling grant—e.g., by indicating that no HARQ retransmissions are associated with a received prescheduling grant. In some examples, after determining that a received DCI message includes (or is) a prescheduling grant, UE 515 may refrain from initiating a retransmission timer based on receiving an RRC message instructing UE 515 to not initiate a retransmission timer for a prescheduling grant.

In some examples, after determining that a received DCI message includes (or is) a prescheduling grant, UE 515 may initiate a prescheduling retransmission timer that, for example, is shorter than a dynamic retransmission timer. In such cases, UE 515 may initiate the prescheduling retransmission timer (drx-RetransmissionTimerULPSG) after a HARQ round trip timer expires.

In some examples, after determining that a received DCI message includes (or is) a prescheduling grant, UE 515 may determine whether to initiate a retransmission timer (e.g., a dynamic retransmission timer or a prescheduling transmission timer) based on a position of the prescheduling grant within a DRX-on interval. For example, UE 515 may refrain from initiating a retransmission timer based on the prescheduling grant occurring in a first portion of a DRX-on interval (e.g., first third of a DRX-on interval, a first half of a DRX-on interval, or second third of a DRX-on interval). Or UE 515 may initiate a retransmission timer based on the prescheduling grant occurring in a second portion of a DRX-on interval (e.g., a second third of a DRX-on interval, a second half of a DRX-on interval, or a last third of a DRX-on interval).

At block 545, UE 515 may identify uplink resources based on the received scheduling messages. In some examples, UE 515 may identify uplink data resources and/or uplink control resources based on the received scheduling messages. In some examples, if the received scheduling message includes (or is) a dynamic grant, UE 515 may identify uplink resources that occur during a DRX-Off interval configured for UE 515. In some examples, if the received scheduling message includes (or is) a prescheduling grant, UE 515 may determine that the uplink resources occur within a DRX-On interval configured for UE 515.

At arrow 550, UE 515 may transmit uplink information to base station 505 using the uplink resources identified based on the one or more received scheduling messages. In some examples, UE 515 may transmit control information over uplink control resources (e.g., PUCCH resources) and data over uplink data resources (e.g., PUSCH resources) indicated by the one or more received scheduling messages. In some examples, if a prescheduling message is received, UE 515 may transmit all of the uplink information to base station 505 during an DRX-On interval configured for UE 515.

At block 555, UE 515 may determine that an event that triggers the transmission of an SR has occurred. In some examples, UE 515 may determine that an SR event has occurred when an amount of data stored in a buffer exceeds a threshold value. In some examples, UE 515 may determine that an SR event has occurred when time-sensitive data is generated at UE 515.

At block 560, UE 515 may identify when a next prescheduling grant is scheduled to be transmitted from base station 505—e.g., based on the periodicity and offset information previously received for the prescheduling type. UE 515 may then determine whether to transmit the scheduling request or to wait for the next prescheduling grant based on the configuration information. In some examples, UE 515 may determine a duration until the next prescheduling grant is scheduled to be received. If the duration exceeds a threshold, UE 515 may determine that a scheduling request is to be transmitted to base station 505. If the duration is less than the threshold, UE 515 may forego transmission of the scheduling request and wait for the next prescheduling grant. In some examples, the duration is based at least in part on a time-sensitivity of the data to be transmitted—e.g., the duration may be shorter if the data is time-sensitive. In some examples, UE 515 may determine whether to transmit the scheduling request based on whether the prescheduling grant or a dynamic scheduling grant that would be triggered by the SR will be received first—e.g., UE 515 may wait for the prescheduling grant if it is to be received before the dynamic scheduling grant.

In some examples, UE 515 may determine a difference between a time when uplink resources are to be scheduled by a prescheduling grant and when resources are likely to be scheduled in response to a scheduling request. In some examples, UE 515 may determine a difference between a time when a prescheduling grant is scheduled to be received and when a dynamic grant is expected to be received in response to the scheduling request. In both cases, UE 515 may determine whether to transmit an SR based on the difference—e.g., UE 515 may transmit the SR if the difference is greater than a threshold. In some examples, the threshold is based on a time-sensitivity of the data to be transmitted.

At arrow 565, if UE 515 determines not to wait for the prescheduling grant, UE 515 may transmit an SR to base station 505 requesting that base station 505 schedule uplink resources for UE 515 to transmit the data to base station 505.

At block 570, if UE 515 determines to wait for the prescheduling grant, UE 515 may wait for the prescheduling grant to be transmitted by base station 505.

At arrow 575, base station 505 may transmit a second scheduling message to UE 515. In some examples, the second scheduling message includes (or is) a dynamic grant and is transmitted in response to a scheduling request received from UE 515. In other examples, the second scheduling message includes (or is) a prescheduling grant and is transmitted in accordance with a prescheduling configuration.

At arrow 580, UE 515 may transmit uplink information to base station 505 using uplink resources indicated by the received second scheduling message. In some examples, UE 515 determines whether to initiate or restart an inactivity timer based on whether the scheduling message includes (or is) a dynamic grant or prescheduling grant as described herein.

In some examples, UE 515 generates data in accordance with a prescheduling configuration. That is, UE 515 may modify its operation so that (when possible) uplink data is generated to coincide with (or be synchronized with) the occurrence of prescheduling grants—e.g., UE 515 may expedite data generation to occur before a prescheduled uplink resource occasion.

In some examples, a downlink scheduling message may be similarly configured as a prescheduling grant. That is, base station 505 may transmit a downlink scheduling grant that results in similar behavior at UE 515—in some examples, such a downlink scheduling grant may be referred to as a downlink prescheduling grant. In some examples, if base station 505 transmits a downlink prescheduling grant to UE 515, UE 515 may refrain from initiating (or restarting) an inactivity timer when the downlink prescheduling grant is received. UE 515 may start (or restart) a prescheduling inactivity timer when the downlink prescheduling grant is received. UE 515 may not start a round trip timer and/or retransmission timer after a downlink prescheduling grant is received. Or UE 515 may use a prescheduling retransmission timer after a downlink prescheduling grant is received.

Figure 6:
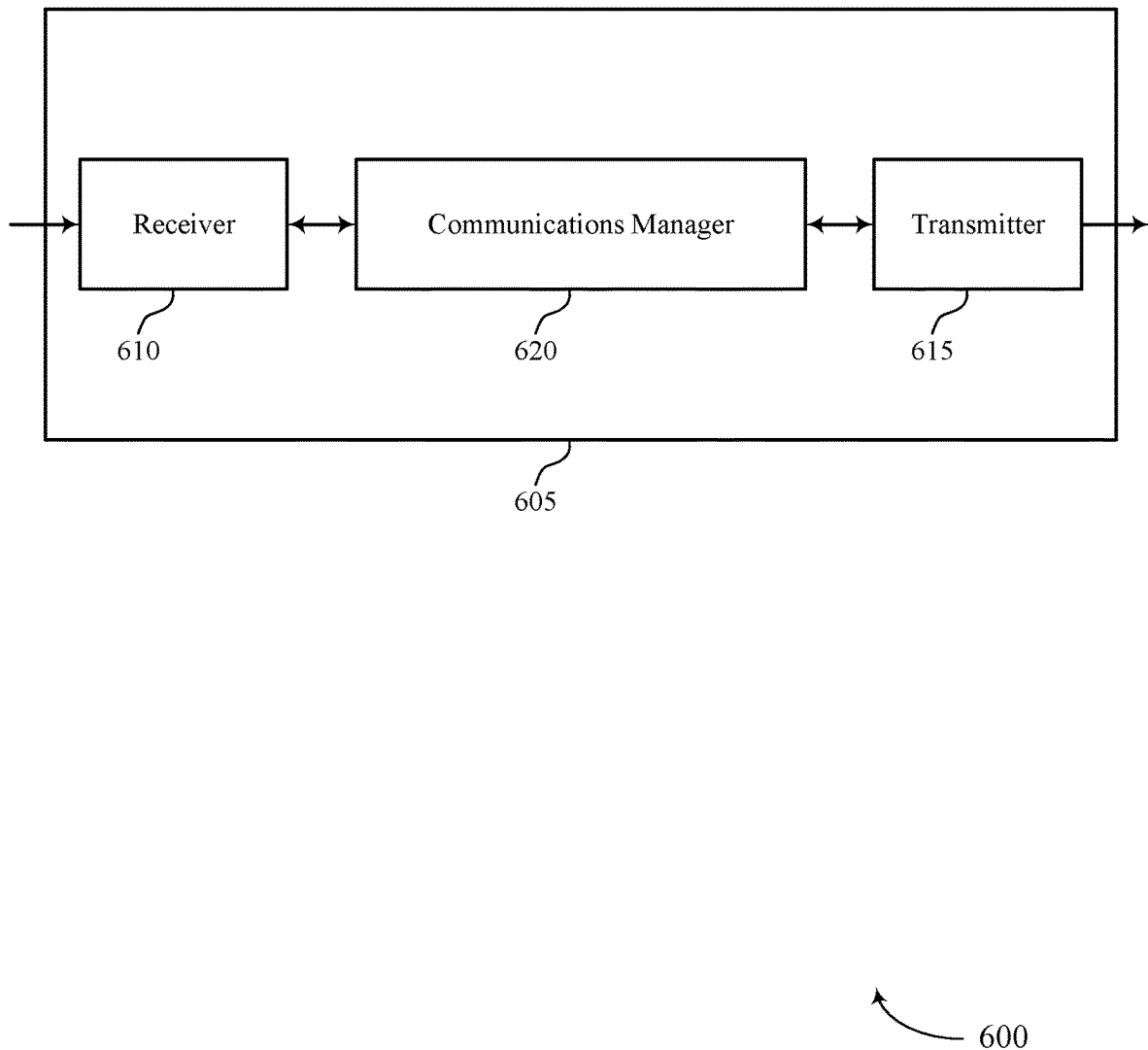
FIGS. 6 and 7 show block diagrams of devices that support techniques for scheduling communication resources in accordance with various aspects of the present disclosure.

FIG. 6 shows a block diagram 600 of a device 605 that supports techniques for scheduling communication resources in accordance with various aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for scheduling communication resources). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to size-based neural network selection for autoencoder-based communication). In some examples, the transmitter 615 may be co-located with a receiver 610 in a transceiver component. The transmitter 615 may utilize a single antenna or a set of multiple antennas.

The communications manager 620, the receiver 610, the transmitter 615, or various combinations thereof or various components thereof may be examples of means for performing various aspects of techniques for scheduling communication resources as described herein.

In some examples, the communications manager 620, the receiver 610, the transmitter 615, or various combinations thereof or components thereof, may be implemented in hardware (e.g., in communications management circuitry). The circuitry may include a processor, a digital signal processor (DSP), an application-specific integrated circuit (ASIC), a field-programmable gate array (FPGA) or other programmable logic device, a discrete gate or transistor logic, discrete hardware components, or any combination thereof designed to perform the functions described in the present disclosure.

Additionally or alternatively, in some examples, the communications manager 620, the receiver 610, the transmitter 615, or various combinations thereof or components thereof, may be implemented in code (e.g., as communications management software or firmware) executed by a processor. If implemented in code executed by a processor, the functions of the communications manager 620, the receiver 610, the transmitter 615, or various combinations thereof or components thereof, may be executed by a general-purpose processor, a DSP, a central processing unit (CPU), an ASIC, an FPGA, or any combination of these or other programmable logic devices.

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured to provide or support a means for receiving control information that schedules a set of uplink resources for the UE in accordance with a prescheduling type, the set of uplink resources being prescheduled in advance of the UE sending one or more requests for uplink resources. The communications manager 620 may be configured to provide or support a means for communicating using the set of uplink resources based on the control information being associated with the prescheduling type.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reducing a power consumption and signaling overhead associated with performing uplink communications.

Figure 7:
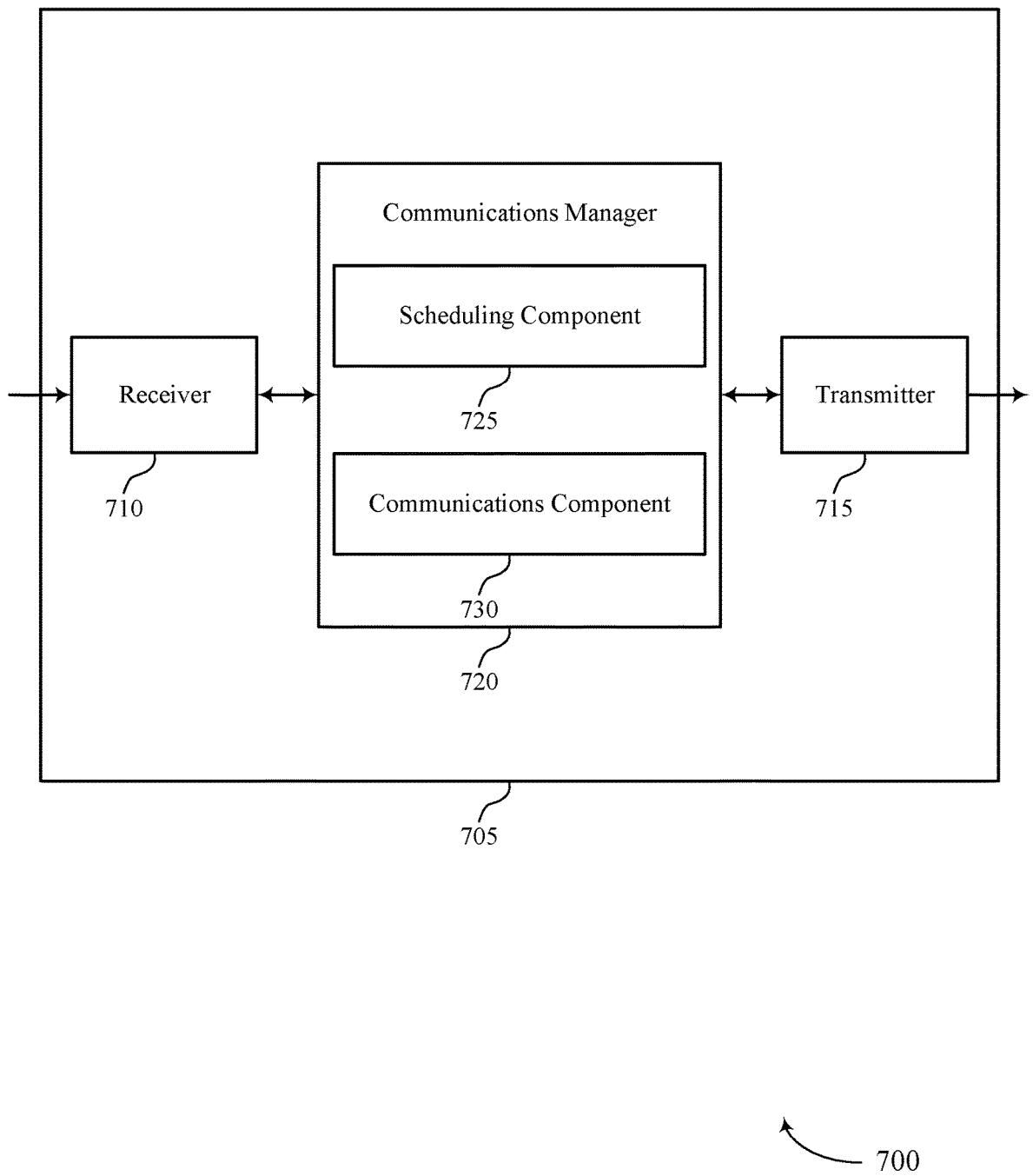

FIG. 7 shows a block diagram 700 of a device 705 that supports techniques for scheduling communication resources in accordance with various aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for scheduling communication resources). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to size-based neural network selection for autoencoder-based communication). In some examples, the transmitter 715 may be co-located with a receiver 710 in a transceiver component. The transmitter 715 may utilize a single antenna or a set of multiple antennas.

The device 705, or various components thereof, may be an example of means for performing various aspects of techniques for scheduling communication resources as described herein. For example, the communications manager 720 may include a scheduling component 725 a communications component 730, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The scheduling component 725 may be configured to provide or support a means for receiving control information that schedules a set of uplink resources for the UE in accordance with a prescheduling type, the set of uplink resources being prescheduled in advance of the UE sending one or more requests for uplink resources. The communications component 730 may be configured to provide or support a means for communicating using the set of uplink resources based on the control information being associated with the prescheduling type.

Figure 8:
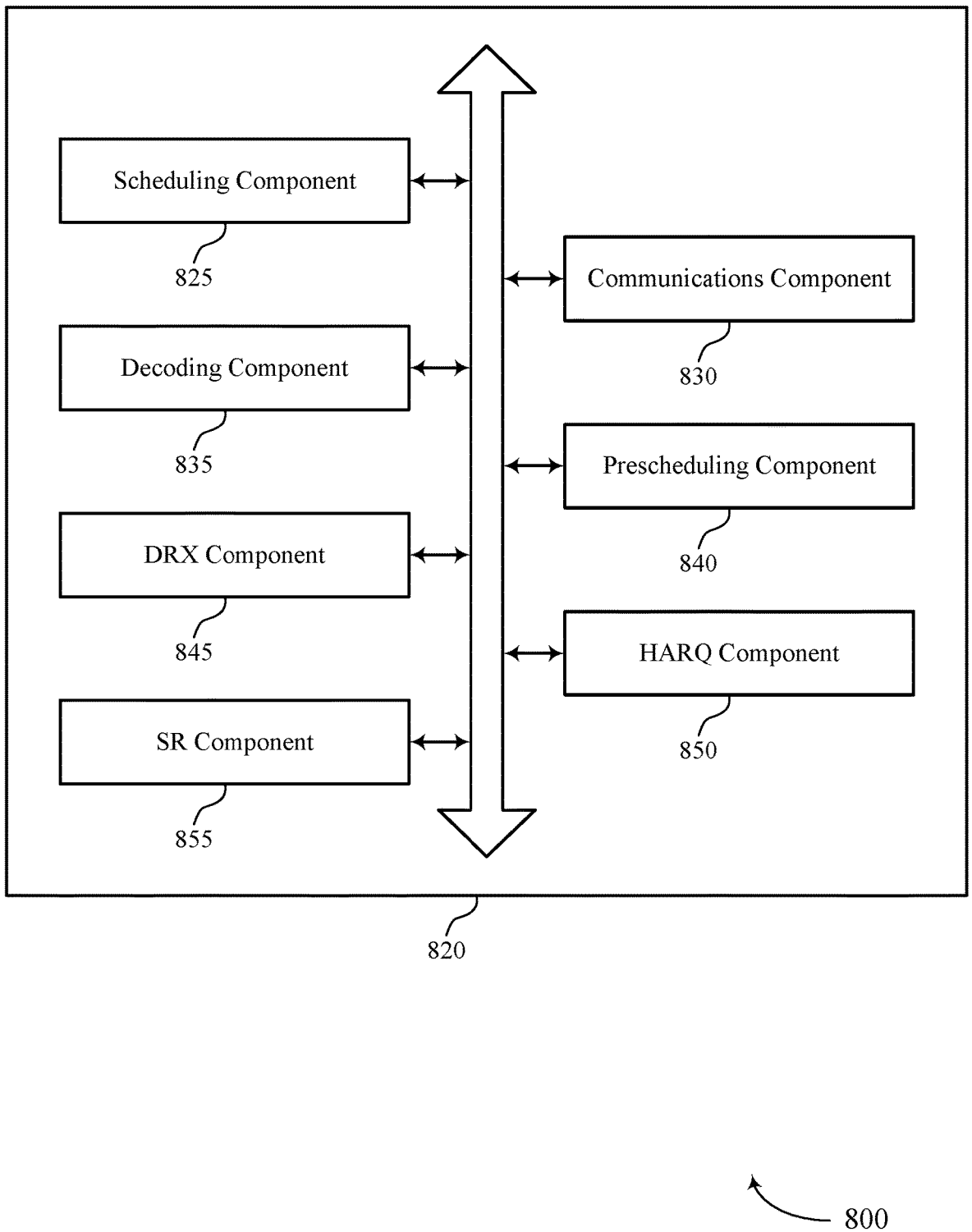
FIG. 8 shows a block diagram of a communications manager that supports techniques for scheduling communication resources in accordance with various aspects of the present disclosure.

FIG. 8 shows a block diagram 800 of a communications manager 820 that supports techniques for scheduling communication resources in accordance with various aspects of the present disclosure. The communications manager 820 may be an example of aspects of a communications manager 620, a communications manager 720, or both, as described herein. The communications manager 820, or various components thereof, may be an example of means for performing various aspects of techniques for scheduling communication resources as described herein. For example, the communications manager 820 may include a scheduling component 825, a communications component 830, a decoding component 835, a prescheduling component 840, a DRX component 845, a HARQ component 850, an SR component 855, or any combination thereof. Each of these components may communicate, directly or indirectly, with one another (e.g., via one or more buses).

The communications manager 820 may support wireless communications at a UE in accordance with examples as disclosed herein. The scheduling component 825 may be configured as or otherwise support a means for receiving control information that schedules a set of uplink resources for the UE in accordance with a prescheduling type, the set of uplink resources being prescheduled in advance of the UE sending one or more requests for uplink resources. The communications component 830 may be configured as or otherwise support a means for communicating using the set of uplink resources based on the control information being associated with the prescheduling type.

In some examples, the control information is received in a downlink control information message, and the decoding component 835 may be configured as or otherwise support a means for decoding the downlink control information message. In some examples, the control information is received in a downlink control information message, and the scheduling component 825 may be configured as or otherwise support a means for determining that the prescheduling type is associated with the control information based on an indicator included in the decoded downlink control information message.

In some examples, the control information is received in a downlink control information message, and the prescheduling component 840 may be configured as or otherwise support a means for identifying an index of a slot, symbol, or resource blocks used for a control channel or a shared channel in which the downlink control information message is received or an uplink transmission scheduled by the downlink control information message is performed. In some examples, the control information is received in a downlink control information message, and the prescheduling component 840 may be configured as or otherwise support a means for determining that the prescheduling type is associated with the downlink control information message based on the index of the slot, the symbol, or the resource blocks.

In some examples, the control information is received in a downlink control information message, and the prescheduling component 840 may be configured as or otherwise support a means for receiving radio resource control information that indicates a configuration for the prescheduling type, the configuration including a periodicity, offset, a frequency position, or any combination thereof for receiving control information that is associated with the prescheduling type. In some examples, the control information is received in a downlink control information message, and the prescheduling component 840 may be configured as or otherwise support a means for determining that the prescheduling type is associated with the downlink control information message based on the configuration and a position of the downlink control information message in a control channel or a position of the shared channel.

In some examples, the scheduling component 825 may be configured as or otherwise support a means for determining a scheduling type of the control information or an uplink transmission. In some examples, the DRX component 845 may be configured as or otherwise support a means for determining, based on the determined scheduling type, whether to start an inactivity timer.

In some examples, the DRX component 845 may be configured as or otherwise support a means for refraining from starting an inactivity timer after receiving the control information based on the control information being associated with the prescheduling type. In some examples, the DRX component 845 may be configured as or otherwise support a means for refraining from restarting the inactivity timer after receiving the control information based on the control information being associated with the prescheduling type.

In some examples, the DRX component 845 may be configured as or otherwise support a means for identifying a discontinuous reception on interval. In some examples, the DRX component 845 may be configured as or otherwise support a means for determining that the control information is received in a first portion of the discontinuous reception on interval. In some examples, the DRX component 845 may be configured as or otherwise support a means for refraining from starting or restarting an inactivity timer based on receiving the control information in the first portion of the discontinuous reception on interval.

In some examples, the DRX component 845 may be configured as or otherwise support a means for identifying a discontinuous reception on interval. In some examples, the DRX component 845 may be configured as or otherwise support a means for determining that the control information is received in a second portion of the discontinuous reception on interval. In some examples, the DRX component 845 may be configured as or otherwise support a means for starting or restarting an inactivity timer based on receiving the control information in the second portion of the discontinuous reception on interval.

In some examples, the HARQ component 850 may be configured as or otherwise support a means for refraining from starting a retransmission timer after receiving the control information based on the control information being associated with the prescheduling type.

In some examples, the HARQ component 850 may be configured as or otherwise support a means for refraining from starting a retransmission timer after receiving the control information based on an indicator included in the control information.

In some examples, the HARQ component 850 may be configured as or otherwise support a means for refraining from starting a retransmission timer after receiving the control information based on a radio resource control configuration.

In some examples, the DRX component 845 may be configured as or otherwise support a means for identifying a discontinuous reception on interval. In some examples, the DRX component 845 may be configured as or otherwise support a means for determining that the control information is received in a first portion of the discontinuous reception on interval. In some examples, the HARQ component 850 may be configured as or otherwise support a means for refraining from starting or restarting a retransmission timer based on receiving the control information in the first portion of the discontinuous reception on interval.

In some examples, the DRX component 845 may be configured as or otherwise support a means for identifying a discontinuous reception on interval. In some examples, the DRX component 845 may be configured as or otherwise support a means for determining that the control information is received in a second portion of the discontinuous reception on interval. In some examples, the HARQ component 850 may be configured as or otherwise support a means for starting or restarting a retransmission timer based on receiving the control information in the second portion of the discontinuous reception on interval.

In some examples, the SR component 855 may be configured as or otherwise support a means for refraining from transmitting a request for uplink resources based on the set of uplink resources being scheduled by the control information.

In some examples, the SR component 855 may be configured as or otherwise support a means for determining a first duration associated with transmitting the request for uplink resources and being scheduled the requested uplink resources. In some examples, the SR component 855 may be configured as or otherwise support a means for determining a second duration until the set of uplink resources is to be scheduled by the control information. In some examples, the SR component 855 may be configured as or otherwise support a means for refraining from transmitting the request for uplink resources based on the second duration being less than the first duration.

In some examples, the SR component 855 may be configured as or otherwise support a means for determining a duration until a second set of uplink resources is to be scheduled by second control information of the prescheduling type. In some examples, the SR component 855 may be configured as or otherwise support a means for refraining from transmitting a request for uplink resources based on the duration being less than a threshold.

In some examples, the threshold is based on a second duration associated with transmitting the request for uplink resources and being scheduled the requested uplink resources.

In some examples, the threshold is based on a quality of service of a set of data at the UE that triggers a scheduling request.

In some examples, the prescheduling component 840 may be configured as or otherwise support a means for receiving radio resource control information that indicates a configuration for the prescheduling type, the configuration including a periodicity, offset, a frequency position, or any combination thereof for receiving control information that is associated with the prescheduling type. In some examples, the SR component 855 may be configured as or otherwise support a means for determining a timing for being scheduled uplink resources in response to a transmitted scheduling request. In some examples, the SR component 855 may be configured as or otherwise support a means for determining whether to transmit a scheduling request based on the timing and the configuration for the prescheduling type.

In some examples, the scheduling component 825 may be configured as or otherwise support a means for receiving radio resource control information that indicates recurring uplink resource positions configured for the UE and that the prescheduling type is associated with the recurring uplink resource positions, where receiving the control information includes receiving a medium access control information that indicates one or more uplink resource positions of the recurring uplink resource positions include the set of uplink resources.

In some examples, the scheduling component 825 may be configured as or otherwise support a means for determining, from a set of multiple scheduling types, a scheduling type associated with the control information, where the set of multiple scheduling types includes a first prescheduling type that uses downlink control information to dynamically schedule uplink resources in anticipation of the one or more requests for uplink resources, a second prescheduling type that uses radio resource control information to statically indicate recurring uplink resource positions and a medium access control information trigger to dynamically schedule uplink resources using one or more uplink resource positions of recurring uplink resource positions indicated by the second prescheduling type in anticipation of the one or more requests for uplink resources, a third scheduling type that uses downlink control information to dynamically schedule uplink resources after receiving a request for uplink resources, and a fourth scheduling type that uses radio resource control information to statically indicate recurring uplink resource positions and a downlink control information trigger to semi-statically schedule uplink resources in recurring uplink resource positions indicated by the fourth scheduling type.

In some examples, the prescheduling type dynamically schedules uplink resources without receiving a request for uplink resources.

Figure 9:
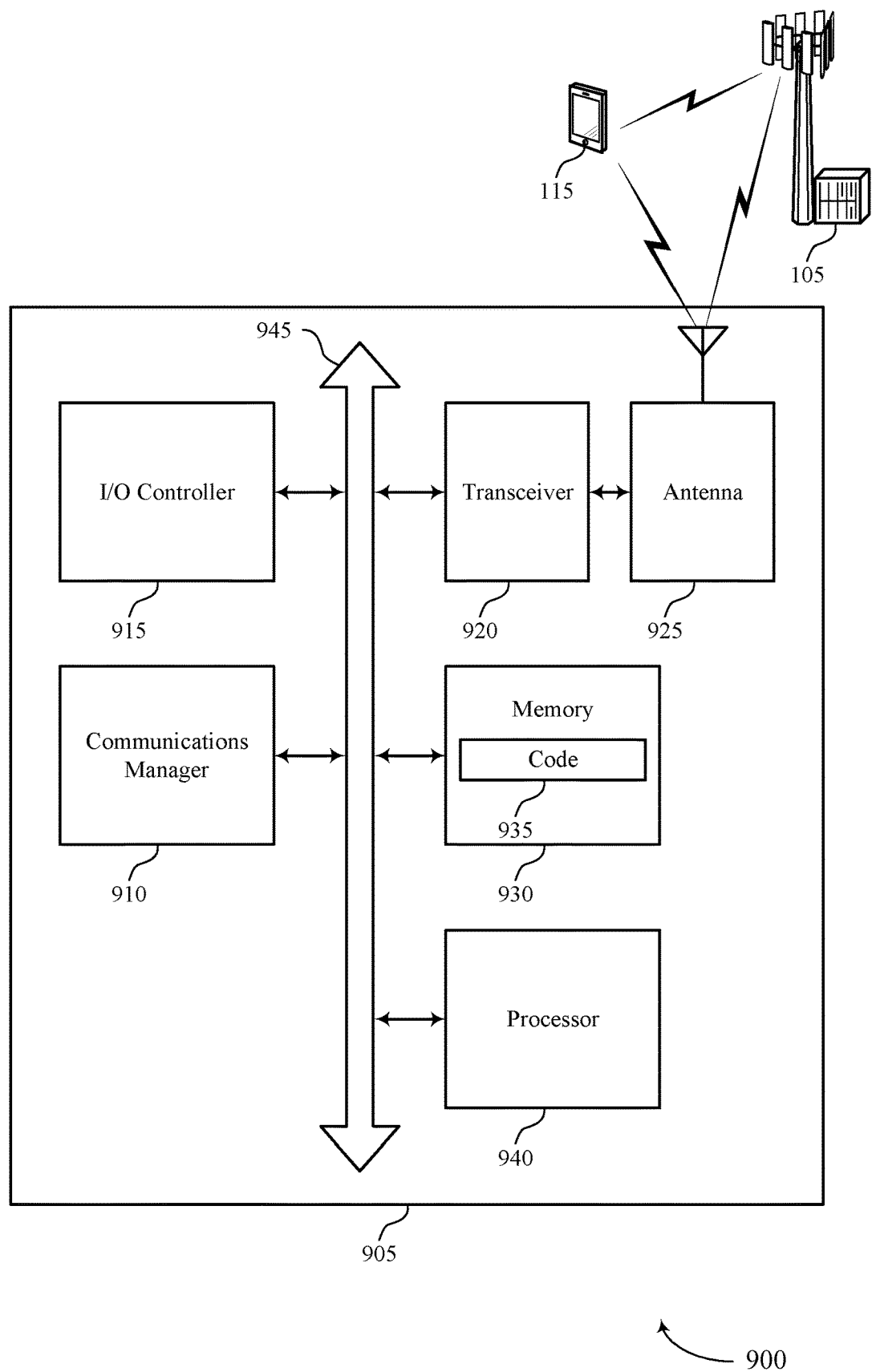
FIG. 9 shows a diagram of a system including a device that supports techniques for scheduling communication resources in accordance with various aspects of the present disclosure.

FIG. 9 shows a diagram of a system 900 including a device 905 that supports techniques for scheduling communication resources in accordance with various aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, including a communications manager 910, an I/O controller 915, a transceiver 920, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In some other cases, the I/O controller 915 may represent or interact with a modem, a keyboard, a mouse, a touchscreen, or a similar device. In some cases, the I/O controller 915 may be implemented as part of a processor, such as the processor 940. In some cases, a user may interact with the device 905 via the I/O controller 915 or via hardware components controlled by the I/O controller 915.

In some cases, the device 905 may include an antenna 925. However, in some other cases the device 905 may have more than one antenna, which may be capable of concurrently transmitting or receiving multiple wireless transmissions. The transceiver 920 may communicate bi-directionally, via the one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to one or more antennas for transmission, and to demodulate packets received from the one or more antennas. The transceiver 920, or the transceiver 920 and one or more antennas, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or other type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for scheduling communication resources). For example, the device 905 or a component of the device 905 may include a processor 940 and memory 930 coupled to the processor 940, the processor 940 and memory 930 configured to perform various functions described herein.

The communications manager 910 may support wireless communications at a UE in accordance with examples as disclosed herein. For example, the communications manager 910 may be configured to provide or support a means for receiving control information that schedules a set of uplink resources for the UE in accordance with a prescheduling type, the set of uplink resources being prescheduled in advance of the UE sending one or more requests for uplink resources. The communications manager 910 may be configured to provide or support a means for communicating using the set of uplink resources based on the control information being associated with the prescheduling type.

In some examples, the communications manager 910 may be configured to perform various operations (e.g., receiving, monitoring, transmitting) using or otherwise in cooperation with the transceiver 920, the one or more antennas, or any combination thereof. Although the communications manager 910 is illustrated as a separate component, in some examples, one or more functions described with reference to the communications manager 910 may be supported by or performed by the processor 940, the memory 930, the code 935, or any combination thereof. For example, the code 935 may include instructions executable by the processor 940 to cause the device 905 to perform various aspects of techniques for scheduling communication resources as described herein, or the processor 940 and the memory 930 may be otherwise configured to perform or support such operations.

Figure 10:
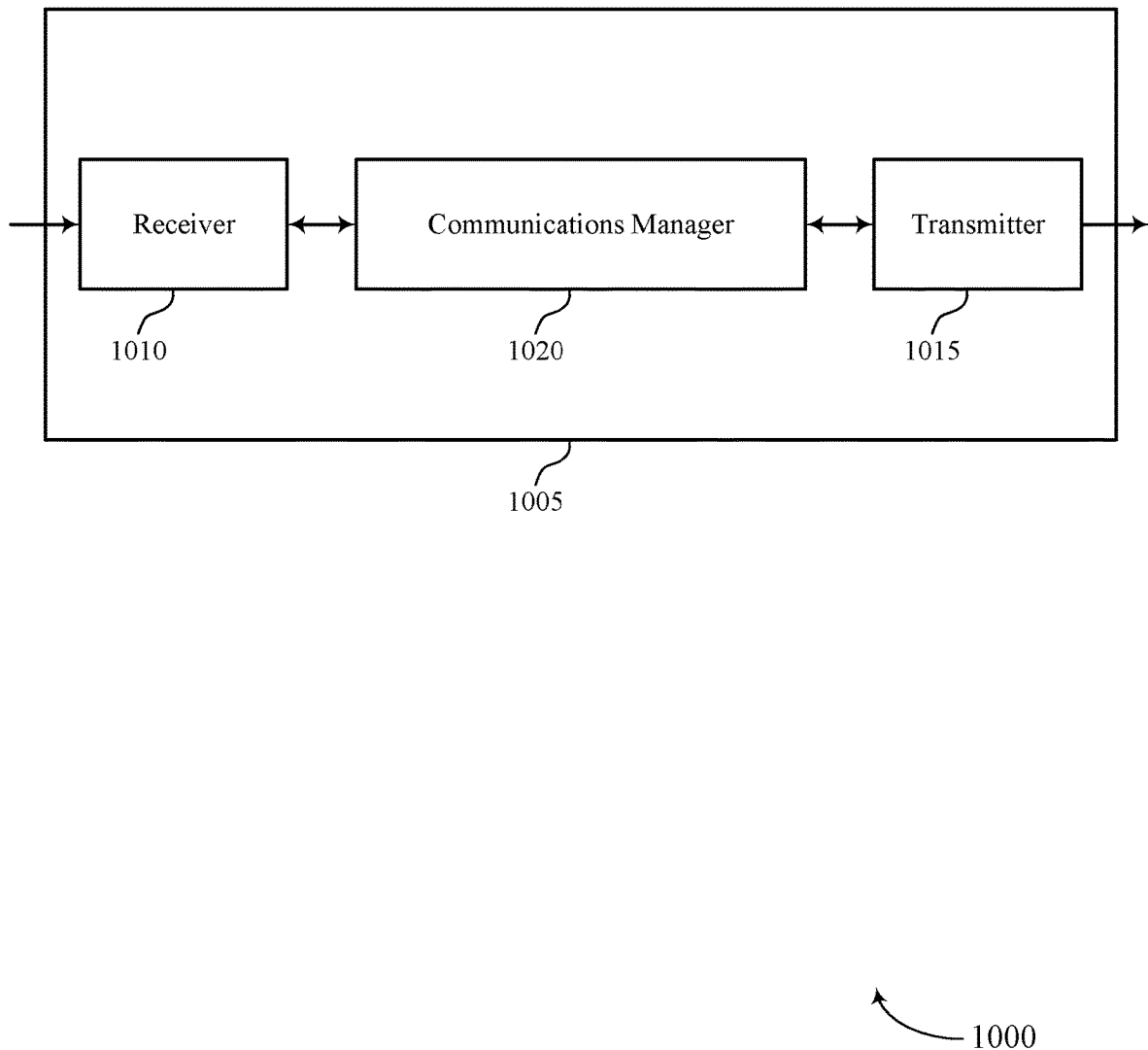
FIGS. 10 and 11 show block diagrams of devices that support techniques for scheduling communication resources in accordance with various aspects of the present disclosure.

FIG. 10 shows a block diagram 1000 of a device 1005 that supports techniques for scheduling communication resources in accordance with various aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for scheduling communication resources). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to size-based neural network selection for autoencoder-based communication). In some examples, the transmitter 1015 may be co-located with a receiver 1010 in a transceiver component. The transmitter 1015 may utilize a single antenna or a set of multiple antennas.

The communications manager 1020, the receiver 1010, the transmitter 1015, or various combinations thereof or various components thereof may be examples of means for performing various aspects of techniques for scheduling communication resources as described herein.

In some examples, the communications manager 1020, the receiver 1010, the transmitter 1015, or various combinations thereof or components thereof, may be implemented in hardware (e.g., in communications management circuitry). The circuitry may include a processor, an DSP, an ASIC, an FPGA or other programmable logic device, a discrete gate or transistor logic, discrete hardware components, or any combination thereof designed to perform the functions described in the present disclosure.

Additionally or alternatively, in some examples, the communications manager 1020, the receiver 1010, the transmitter 1015, or various combinations thereof or components thereof, may be implemented in code (e.g., as communications management software or firmware) executed by a processor. If implemented in code executed by a processor, the functions of the communications manager 1020, the receiver 1010, the transmitter 1015, or various combinations thereof or components thereof, may be executed by a general-purpose processor, a DSP, a CPU, an ASIC, an FPGA, or any combination of these or other programmable logic devices.

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured to provide or support a means for selecting a prescheduling type for scheduling uplink resources for a UE, the prescheduling type being used to preschedule a set of uplink resources for the UE in advance of receiving one or more requests for uplink resources from the UE. The communications manager 1020 may be configured to provide or support a means for transmitting control information that schedules the set of uplink resources for the UE in accordance with the selected prescheduling type, where the selected prescheduling type associated with the control information is indicated based on transmitting the control information.

Figure 11:
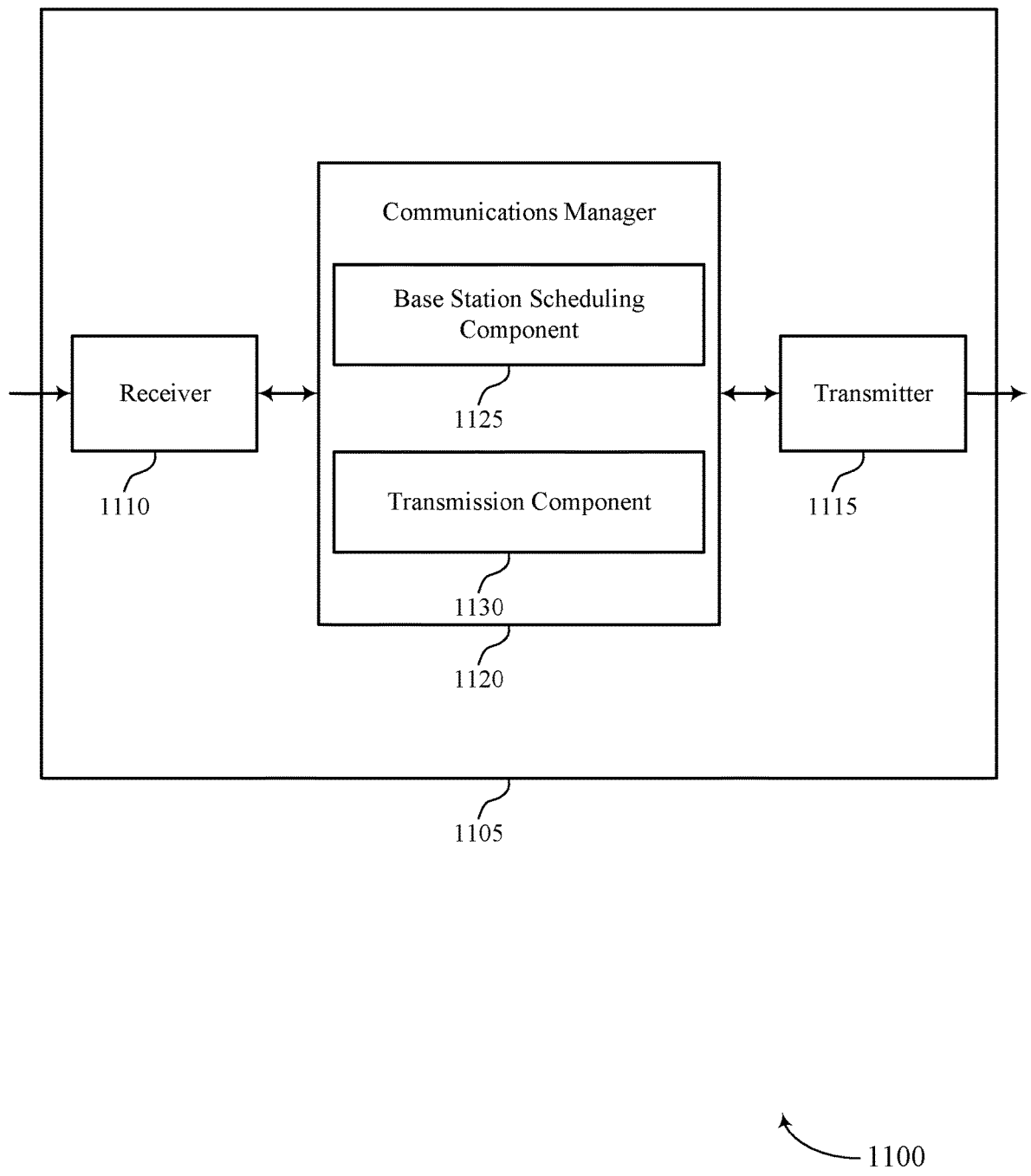

FIG. 11 shows a block diagram 1100 of a device 1105 that supports techniques for scheduling communication resources in accordance with various aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for scheduling communication resources). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to size-based neural network selection for autoencoder-based communication). In some examples, the transmitter 1115 may be co-located with a receiver 1110 in a transceiver component. The transmitter 1115 may utilize a single antenna or a set of multiple antennas.

The device 1105, or various components thereof, may be an example of means for performing various aspects of techniques for scheduling communication resources as described herein. For example, the communications manager 1120 may include a base station scheduling component 1125 a transmission component 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The base station scheduling component 1125 may be configured to provide or support a means for selecting a prescheduling type for scheduling uplink resources for a UE, the prescheduling type being used to preschedule a set of uplink resources for the UE in advance of receiving one or more requests for uplink resources from the UE. The transmission component 1130 may be configured to provide or support a means for transmitting control information that schedules the set of uplink resources for the UE in accordance with the selected prescheduling type, where the selected prescheduling type associated with the control information is indicated based on transmitting the control information.

By including or configuring the communications manager 1120 in accordance with examples as described herein, the device 1105 may support techniques for reducing a power consumption of a UE and reducing signaling overhead associated with performing uplink communications.

Figure 12:
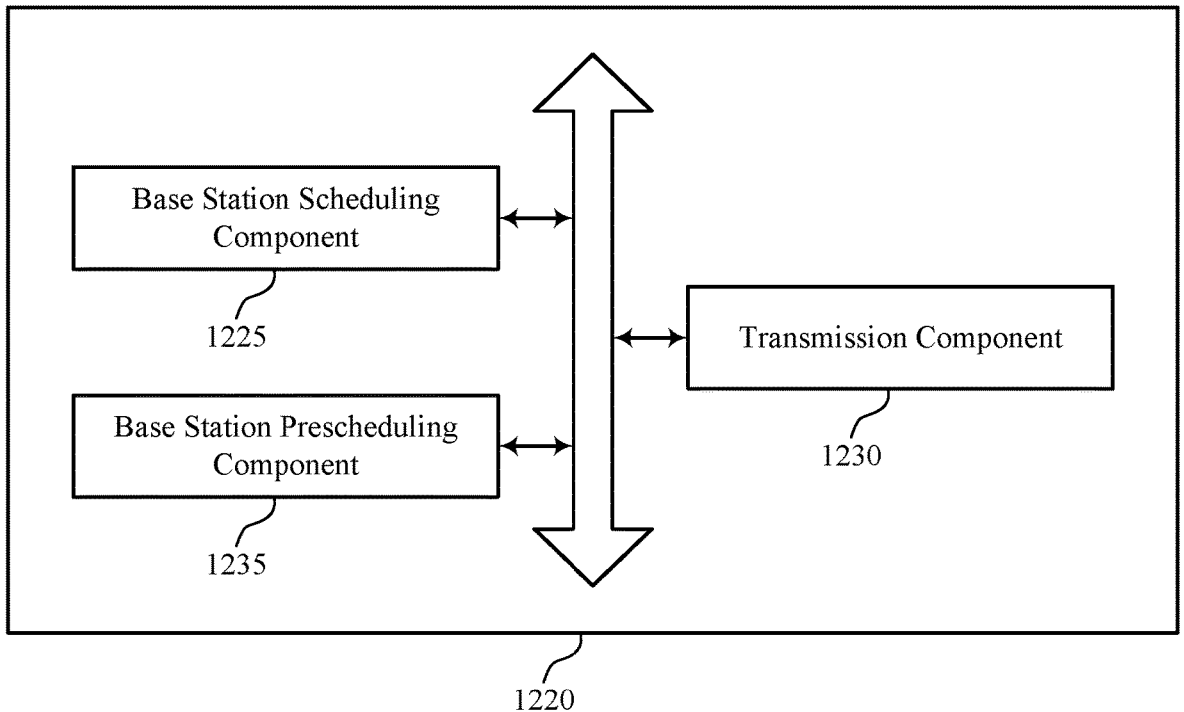
FIG. 12 shows a block diagram of a communications manager that supports techniques for scheduling communication resources in accordance with various aspects of the present disclosure.

FIG. 12 shows a block diagram 1200 of a communications manager 1220 that supports techniques for scheduling communication resources in accordance with various aspects of the present disclosure. The communications manager 1220 may be an example of aspects of a communications manager 1020, a communications manager 1120, or both, as described herein. The communications manager 1220, or various components thereof, may be an example of means for performing various aspects of techniques for scheduling communication resources as described herein. For example, the communications manager 1220 may include a base station scheduling component 1225, a transmission component 1230, a base station prescheduling component 1235, or any combination thereof. Each of these components may communicate, directly or indirectly, with one another (e.g., via one or more buses).

The communications manager 1220 may support wireless communications at a base station in accordance with examples as disclosed herein. The base station scheduling component 1225 may be configured to provide or support a means for selecting a prescheduling type for scheduling uplink resources for a UE, the prescheduling type being used to preschedule a set of uplink resources for the UE in advance of receiving one or more requests for uplink resources from the UE. The transmission component 1230 may be configured to provide or support a means for transmitting control information that schedules the set of uplink resources for the UE in accordance with the selected prescheduling type, where the selected prescheduling type associated with the control information is indicated based on transmitting the control information.

In some examples, the base station prescheduling component 1235 may be configured to provide or support a means for using the prescheduling type to schedule the set of uplink resources based on the selecting. In some examples, the base station prescheduling component 1235 may be configured to provide or support a means for generating a downlink control information message including an indication that the downlink control information message is associated with the prescheduling type based on using the prescheduling type, where transmitting the control information includes transmitting the downlink control information message.

In some examples, the base station prescheduling component 1235 may be configured to provide or support a means for using the prescheduling type to schedule the set of uplink resources based on the selecting. In some examples, the base station prescheduling component 1235 may be configured to provide or support a means for generating a downlink control information message based on using the prescheduling type, where transmitting the control information includes transmitting the downlink control information message using a slot index, a symbol index, or a resource block index of a control channel or a shared channel associated with the prescheduling type.

In some examples, the base station prescheduling component 1235 may be configured to provide or support a means for transmitting radio resource control information that indicates a configuration for the prescheduling type, the configuration including a periodicity, offset, a frequency, or any combination thereof for receiving control information that is associated with the prescheduling type.

In some examples, the base station scheduling component 1225 may be configured to provide or support a means for transmitting radio resource control information that indicates recurring uplink resource positions configured for the UE and that the prescheduling type is associated with the recurring uplink resource positions, where transmitting the control information includes transmitting a medium access control information that indicates one or more uplink resource positions of the recurring uplink resource positions include the set of uplink resources.

In some examples, the base station scheduling component 1225 may be configured to provide or support a means for determining the prescheduling type from a set of multiple scheduling types, the set of multiple scheduling types including a first prescheduling type that uses downlink control information to dynamically schedule uplink resources in anticipation of one or more requests for uplink resources, a second prescheduling type that uses radio resource control information to statically indicate recurring uplink resource positions and a medium access control information trigger to dynamically schedule uplink resources using one or more uplink resource positions of the recurring uplink resource positions in anticipation of one or more requests for uplink resources, a third scheduling type that uses downlink control information to dynamically schedule uplink resources after receiving a request for uplink resources, and a fourth scheduling type that uses radio resource control information to statically indicate recurring uplink resource positions and a downlink control information trigger to semi-statically schedule uplink resources in the recurring uplink resource positions.

In some examples, the control information is transmitted based on a discontinuous reception cycle configured for the UE.

Figure 13:
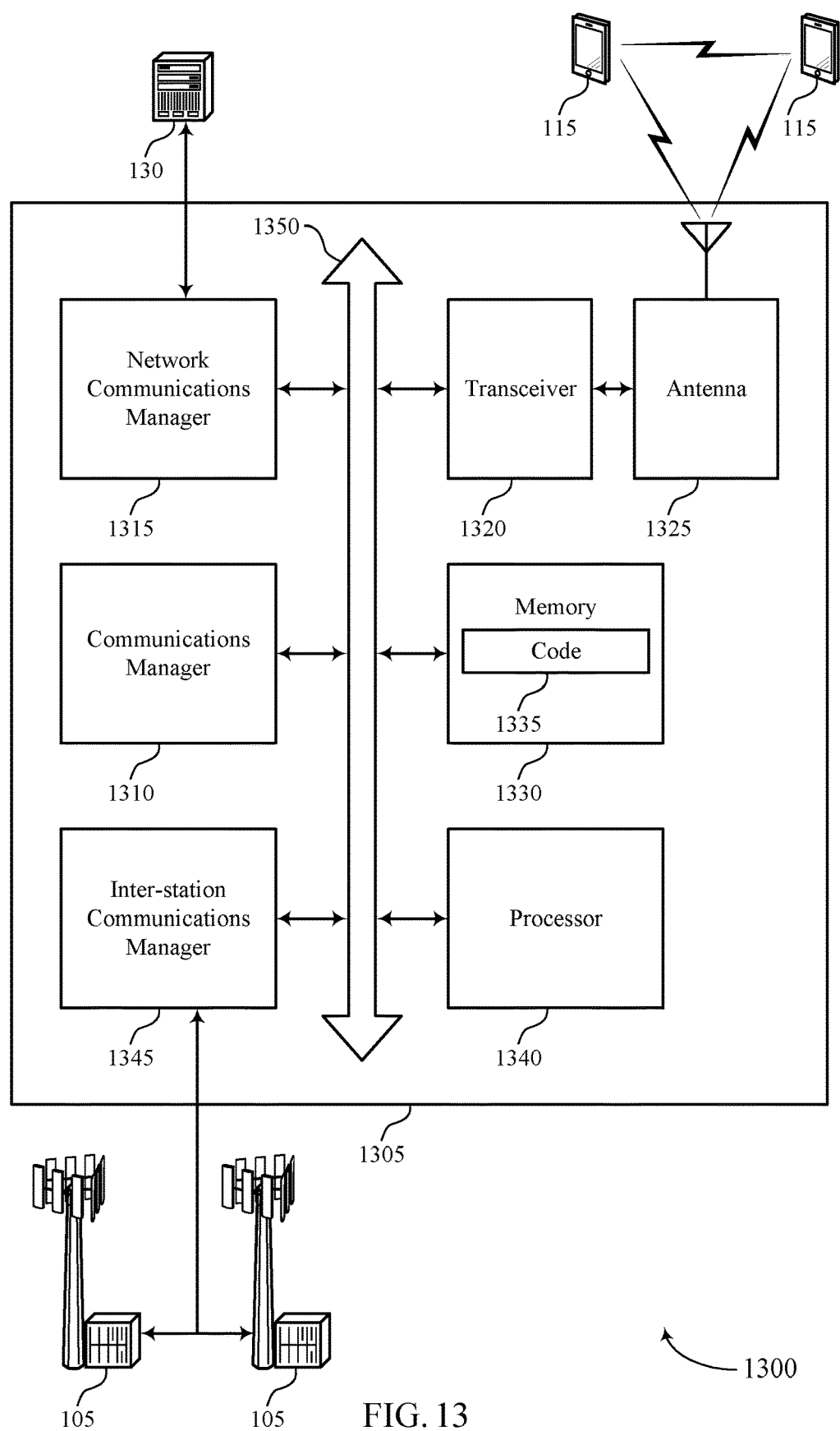
FIG. 13 shows a diagram of a system including a device that supports techniques for scheduling communication resources in accordance with various aspects of the present disclosure.

FIG. 13 shows a diagram of a system 1300 including a device 1305 that supports techniques for scheduling communication resources in accordance with various aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, including a communications manager 1310, a network communications manager 1315, a transceiver 1320, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1315 may manage communications with a core network (e.g., via one or more wired backhaul links). For example, the network communications manager 1315 may manage the transfer of data communications for client devices, such as one or more UEs 115.

In some cases, the device 1305 may include an antenna 1325. However, in some other cases the device 1305 may have more than one antenna, which may be capable of concurrently transmitting or receiving multiple wireless transmissions. The transceiver 1320 may communicate bi-directionally, via the one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to one or more antennas for transmission, and to demodulate packets received from the one or more antennas. The transceiver 1320, or the transceiver 1320 and one or more antennas, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for scheduling communication resources). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1310 may support wireless communications at a base station in accordance with examples as disclosed herein. For example, the communications manager 1310 may be configured to provide or support a means for selecting a prescheduling type for scheduling uplink resources for a UE, the prescheduling type being used to preschedule a set of uplink resources for the UE in advance of receiving one or more requests for uplink resources from the UE. The communications manager 1310 may be configured to provide or support a means for transmitting control information that schedules the set of uplink resources for the UE in accordance with the selected prescheduling type, where the selected prescheduling type associated with the control information is indicated based on transmitting the control information.

In some examples, the communications manager 1310 may be configured to perform various operations (e.g., receiving, monitoring, transmitting) using or otherwise in cooperation with the transceiver 1320, the one or more antennas, or any combination thereof. Although the communications manager 1310 is illustrated as a separate component, in some examples, one or more functions described with reference to the communications manager 1310 may be supported by or performed by the processor 1340, the memory 1330, the code 1335, or any combination thereof. For example, the code 1335 may include instructions executable by the processor 1340 to cause the device 1305 to perform various aspects of techniques for scheduling communication resources as described herein, or the processor 1340 and the memory 1330 may be otherwise configured to perform or support such operations.

Figure 14:
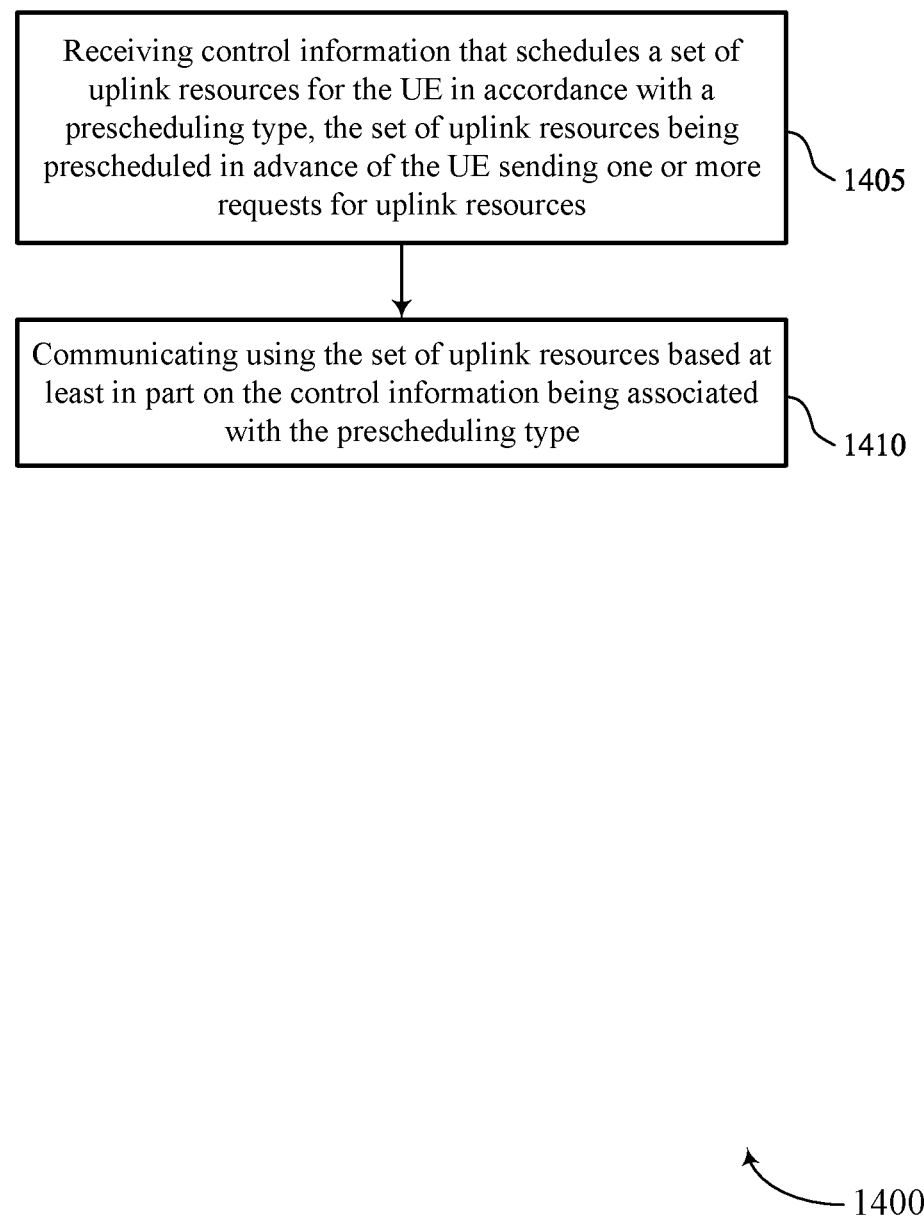
FIGS. 14 and 15 show flowcharts illustrating methods that support techniques for scheduling communication resources in accordance with various aspects of the present disclosure.

FIG. 14 shows a flowchart illustrating a method 1400 that supports techniques for scheduling communication resources in accordance with various aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving control information that schedules the set of uplink resources for the UE in accordance with a prescheduling type, the set of uplink resources being prescheduled in advance of the UE sending one or more requests for uplink resources. The operations of 1405 may be performed according to the methods described herein. In some examples, aspects of the operations of 1405 may be performed by a scheduling component 825 as described with reference to FIG. 8.

At 1410, the method may include communicating using the set of uplink resources based on the control information being associated with the prescheduling type. The operations of 1410 may be performed according to the methods described herein. In some examples, aspects of the operations of 1410 may be performed by a communications component 830 as described with reference to FIG. 8.

Figure 15:
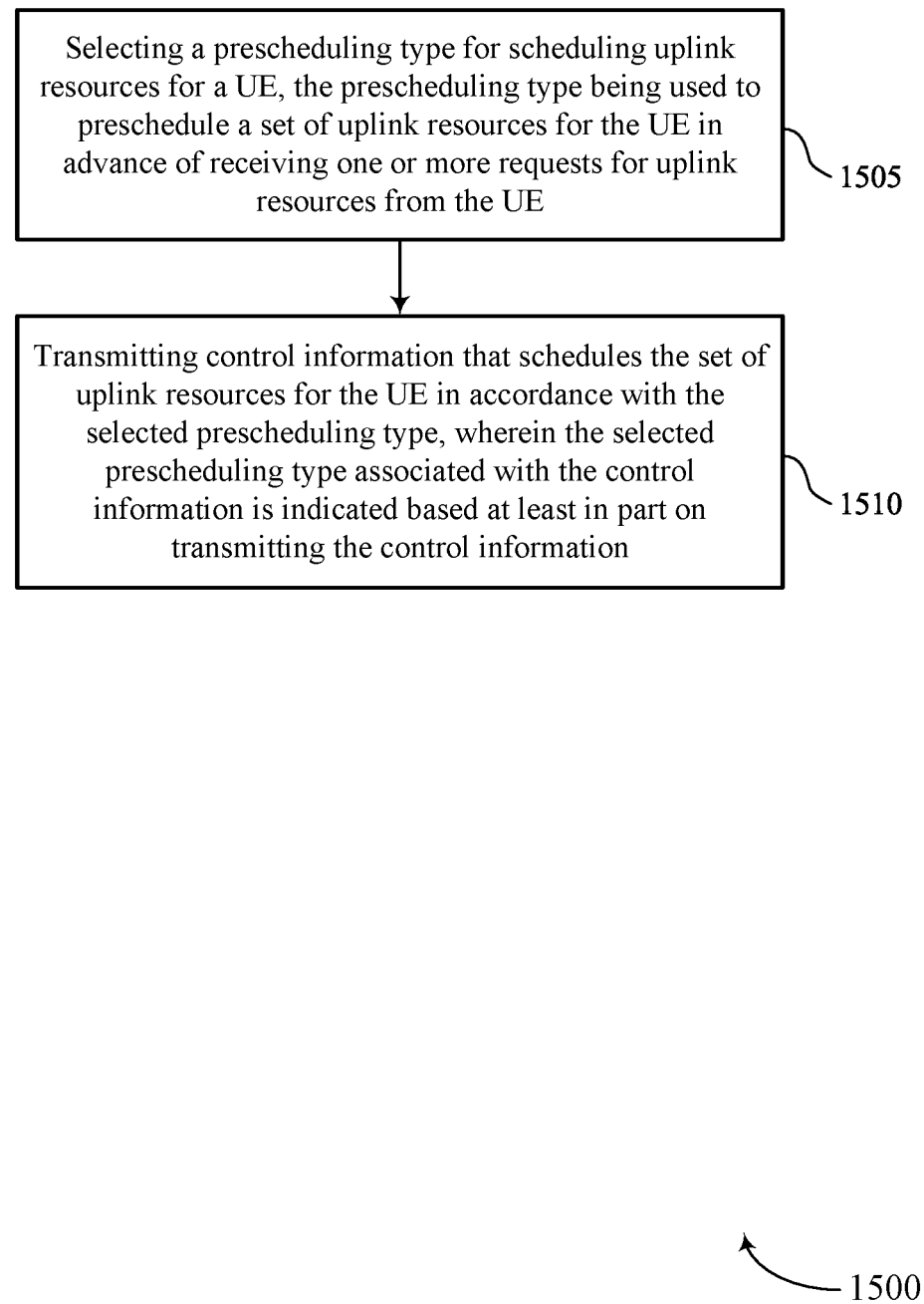

FIG. 15 shows a flowchart illustrating a method 1500 that supports techniques for scheduling communication resources in accordance with various aspects of the present disclosure. The operations of the method 1500 may be implemented by a base station or its components as described herein. For example, the operations of the method 1500 may be performed by a base station 105 as described with reference to FIGS. 1 through 5 and 10 through 13. In some examples, a base station may execute a set of instructions to control the functional elements of the base station to perform the described functions. Additionally, or alternatively, the base station may perform aspects of the described functions using special-purpose hardware.

At 1505, the method may include selecting a prescheduling type for scheduling uplink resources for a UE, the prescheduling type being used to preschedule a set of uplink resources for the UE in advance of receiving one or more requests for uplink resources from the UE. The operations of 1505 may be performed according to the methods described herein. In some examples, aspects of the operations of 1505 may be performed by a base station scheduling component 1225 as described with reference to FIG. 12.

At 1510, the method may include transmitting control information that schedules a set of uplink resources for the UE in accordance with the selected prescheduling type, where the selected prescheduling type associated with the control information is indicated based on transmitting the control information. The operations of 1510 may be performed according to the methods described herein. In some examples, aspects of the operations of 1510 may be performed by a transmission component 1230 as described with reference to FIG. 12.

The following provides an overview of aspects of the present disclosure:

Aspect 1: A method for wireless communications at a UE, comprising: receiving control information that schedules a set of uplink resources for the UE in accordance with a prescheduling type, the set of uplink resources being prescheduled in advance of the UE sending one or more requests for uplink resources; and communicating using the set of uplink resources based at least in part on the control information being associated with the prescheduling type.

Aspect 2: The method of aspect 1, wherein the control information is received in a downlink control information message, the method further comprising: decoding the downlink control information message; and determining that the prescheduling type is associated with the control information based at least in part on an indicator included in the decoded downlink control information message.

Aspect 3: The method of any of aspects 1 through 2, wherein the control information is received in a downlink control information message, the method further comprising: identifying an index of a slot, symbol, or resource blocks used for a control channel or a shared channel in which the downlink control information message is received or an uplink transmission scheduled by the downlink control information message is performed; and determining that the prescheduling type is associated with the downlink control information message based at least in part on the index of the slot, the symbol, or the resource blocks.

Aspect 4: The method of any of aspects 1 through 3, wherein the control information is received in a downlink control information message, the method further comprising: receiving radio resource control information that indicates a configuration for the prescheduling type, the configuration comprising a periodicity, offset, a frequency position, or any combination thereof for receiving control information that is associated with the prescheduling type; and determining that the prescheduling type is associated with the downlink control information message based at least in part on the configuration and a position of the downlink control information message in a control channel or a position of the shared channel.

Aspect 5: The method of any of aspects 1 through 4, further comprising: determining a scheduling type of the control information or an uplink transmission; and determining, based at least in part on the determined scheduling type, whether to start an inactivity timer.

Aspect 6: The method of any of aspects 1 through 5, further comprising: refraining from starting an inactivity timer after receiving the control information based at least in part on the control information being associated with the prescheduling type; or refraining from restarting the inactivity timer after receiving the control information based at least in part on the control information being associated with the prescheduling type.

Aspect 7: The method of any of aspects 1 through 6, further comprising: identifying a discontinuous reception on interval; determining that the control information is received in a first portion of the discontinuous reception on interval; and refraining from starting or restarting an inactivity timer based at least in part on receiving the control information in the first portion of the discontinuous reception on interval.

Aspect 8: The method of any of aspects 1 through 7, further comprising: identifying a discontinuous reception on interval; determining that the control information is received in a second portion of the discontinuous reception on interval; and starting or restarting an inactivity timer based at least in part on receiving the control information in the second portion of the discontinuous reception on interval.

Aspect 9: The method of any of aspects 1 through 8, further comprising: refraining from starting a retransmission timer after receiving the control information based at least in part on the control information being associated with the prescheduling type.

Aspect 10: The method of any of aspects 1 through 9, further comprising: refraining from starting a retransmission timer after receiving the control information based at least in part on an indicator included in the control information.

Aspect 11: The method of any of aspects 1 through 10, further comprising: refraining from starting a retransmission timer after receiving the control information based at least in part on a radio resource control configuration.

Aspect 12: The method of any of aspects 1 through 11, further comprising: identifying a discontinuous reception on interval; determining that the control information is received in a first portion of the discontinuous reception on interval; and refraining from starting or restarting a retransmission timer based at least in part on receiving the control information in the first portion of the discontinuous reception on interval.

Aspect 13: The method of any of aspects 1 through 12, further comprising: identifying a discontinuous reception on interval; determining that the control information is received in a second portion of the discontinuous reception on interval; and starting or restarting a retransmission timer based at least in part on receiving the control information in the second portion of the discontinuous reception on interval.

Aspect 14: The method of any of aspects 1 through 13, further comprising: refraining from transmitting a request for uplink resources based at least in part on the set of uplink resources being scheduled by the control information.

Aspect 15: The method of aspect 14, further comprising: determining a first duration associated with transmitting the request for uplink resources and being scheduled the requested uplink resources; determining a second duration until the set of uplink resources is to be scheduled by the control information; and refraining from transmitting the request for uplink resources based at least in part on the second duration being less than the first duration.

Aspect 16: The method of any of aspects 1 through 15, further comprising: determining a duration until a second set of uplink resources is to be scheduled by second control information of the prescheduling type; and refraining from transmitting a request for uplink resources based at least in part on the duration being less than a threshold.

Aspect 17: The method of aspect 16, wherein the threshold is based at least in part on a second duration associated with transmitting the request for uplink resources and being scheduled the requested uplink resources.

Aspect 18: The method of any of aspects 16 through 17, wherein the threshold is based at least in part on a quality of service of a set of data at the UE that triggers a scheduling request.

Aspect 19: The method of any of aspects 1 through 18, further comprising: receiving radio resource control information that indicates a configuration for the prescheduling type, the configuration comprising a periodicity, offset, a frequency position, or any combination thereof for receiving control information that is associated with the prescheduling type; determining a timing for being scheduled uplink resources in response to a transmitted scheduling request; and determining whether to transmit a scheduling request based at least in part on the timing and the configuration for the prescheduling type.

Aspect 20: The method of any of aspects 1 through 19, further comprising: receiving radio resource control information that indicates recurring uplink resource positions configured for the UE and that the prescheduling type is associated with the recurring uplink resource positions, wherein receiving the control information comprises receiving a medium access control information that indicates one or more uplink resource positions of the recurring uplink resource positions comprise the set of uplink resources.

Aspect 21: The method of any of aspects 1 through 20, further comprising: determining, from a plurality of scheduling types, a scheduling type associated with the control information, wherein the plurality of scheduling types comprises a first prescheduling type that uses downlink control information to dynamically schedule uplink resources in anticipation of the one or more requests for uplink resources, a second prescheduling type that uses radio resource control information to statically indicate recurring uplink resource positions and a medium access control information trigger to dynamically schedule uplink resources using one or more uplink resource positions of recurring uplink resource positions indicated by the second prescheduling type in anticipation of the one or more requests for uplink resources, a third scheduling type that uses downlink control information to dynamically schedule uplink resources after receiving a request for uplink resources, and a fourth scheduling type that uses radio resource control information to statically indicate recurring uplink resource positions and a downlink control information trigger to semi-statically schedule uplink resources in recurring uplink resource positions indicated by the fourth scheduling type.

Aspect 22: The method of any of aspects 1 through 21, wherein the prescheduling type dynamically schedules uplink resources without receiving a request for uplink resources.

Aspect 23: A method for wireless communications at a base station, comprising: selecting a prescheduling type for scheduling uplink resources for a UE, the prescheduling type being used to preschedule a set of uplink resources for the UE in advance of receiving one or more requests for uplink resources from the UE; and transmitting control information that schedules the set of uplink resources for the UE in accordance with the selected prescheduling type, wherein the selected prescheduling type associated with the control information is indicated based at least in part on transmitting the control information.

Aspect 24: The method of aspect 23, further comprising: using the prescheduling type to schedule the set of uplink resources based at least in part on the selecting; and generating a downlink control information message comprising an indication that the downlink control information message is associated with the prescheduling type based at least in part on using the prescheduling type, wherein transmitting the control information comprises transmitting the downlink control information message.

Aspect 25: The method of any of aspects 23 through 24, further comprising: using the prescheduling type to schedule the set of uplink resources based at least in part on the selecting; and generating a downlink control information message based at least in part on using the prescheduling type, wherein transmitting the control information comprises transmitting the downlink control information message using a slot index, a symbol index, or a resource block index of a control channel or a shared channel associated with the prescheduling type.

Aspect 26: The method of any of aspects 23 through 25, further comprising: transmitting radio resource control information that indicates a configuration for the prescheduling type, the configuration comprising a periodicity, offset, a frequency, or any combination thereof for receiving control information that is associated with the prescheduling type.

Aspect 27: The method of any of aspects 23 through 26, further comprising: transmitting radio resource control information that indicates recurring uplink resource positions configured for the UE and that the prescheduling type is associated with the recurring uplink resource positions, wherein transmitting the control information comprises transmitting a medium access control information that indicates one or more uplink resource positions of the recurring uplink resource positions comprise the set of uplink resources.

Aspect 28: The method of any of aspects 23 through 27, further comprising: determining the prescheduling type from a plurality of scheduling types, the plurality of scheduling types comprising a first prescheduling type that uses downlink control information to dynamically schedule uplink resources in anticipation of the one or more requests for uplink resources, a second prescheduling type that uses radio resource control information to statically indicate recurring uplink resource positions and a medium access control information trigger to dynamically schedule uplink resources using one or more uplink resource positions of recurring uplink resource positions indicated by the second prescheduling type in anticipation of the one or more requests for uplink resources, a third scheduling type that uses downlink control information to dynamically schedule uplink resources after receiving a request for uplink resources, and a fourth scheduling type that uses radio resource control information to statically indicate recurring uplink resource positions and a downlink control information trigger to semi-statically schedule uplink resources in recurring uplink resource positions indicated by the fourth scheduling type.

Aspect 29: The method of any of aspects 23 through 28, wherein the control information is transmitted based at least in part on a discontinuous reception cycle configured for the UE.

Aspect 30: An apparatus for wireless communications at a UE, comprising a processor; memory coupled with the processor; and instructions stored in the memory and executable by the processor to cause the apparatus to perform a method of any of aspects 1 through 22.

Aspect 31: An apparatus for wireless communications at a UE, comprising at least one means for performing a method of any of aspects 1 through 22.

Aspect 32: A non-transitory computer-readable medium storing code for wireless communications at a UE, the code comprising instructions executable by a processor to perform a method of any of aspects 1 through 22.

Aspect 33: An apparatus for wireless communications at a base station, comprising a processor; memory coupled with the processor; and instructions stored in the memory and executable by the processor to cause the apparatus to perform a method of any of aspects 23 through 29.

Aspect 34: An apparatus for wireless communications at a base station, comprising at least one means for performing a method of any of aspects 23 through 29.

Aspect 35: A non-transitory computer-readable medium storing code for wireless communications at a base station, the code comprising instructions executable by a processor to perform a method of any of aspects 23 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving one or more messages including a first scheduling grant corresponding to a semi-static scheduling type or a dynamic scheduling type;
   initiating an inactivity timer, a retransmission timer, or both, in response to receiving the first scheduling grant;
   receiving downlink control information in a downlink control information message that preschedules a set of uplink resources for the UE prior to the UE requesting uplink resources;
   refraining, in response to the downlink control information prescheduling the set of uplink resources for the UE in accordance with a prescheduling type, from restarting the inactivity timer, the retransmission timer, or both, wherein an expiration of the inactivity timer, the retransmission timer, or both, is determined relative to the initiation of the inactivity timer, the retransmission timer, or both, in response to reception of the first scheduling grant; and
   communicating using the set of uplink resources based at least in part on the downlink control information being associated with the prescheduling type.

2. The method of claim 1, further comprising:
   decoding the downlink control information message; and
   determining that the prescheduling type is associated with the downlink control information based at least in part on an indicator included in the decoded downlink control information message.

3. The method of claim 1, further comprising:
   identifying an index of a slot, symbol, or resource blocks used for a control channel or a shared channel in which the downlink control information message is received or an uplink transmission scheduled by the downlink control information message is performed; and
   determining that the prescheduling type is associated with the downlink control information message based at least in part on the index of the slot, the symbol, or the resource blocks.

4. The method of claim 1, further comprising:
   receiving radio resource control information that indicates a configuration for the prescheduling type, the configuration comprising a periodicity, offset, a frequency position, or any combination thereof for receiving control information that is associated with the prescheduling type; and
   determining that the prescheduling type is associated with the downlink control information message based at least in part on the configuration and a position of the downlink control information message in a control channel or a position of a shared channel.

5. The method of claim 1, further comprising:
   determining a scheduling type of the downlink control information or an uplink transmission; and
   determining, based at least in part on the determined scheduling type, whether to start the inactivity timer.

6. The method of claim 1, further comprising:
   identifying a discontinuous reception on interval;
   determining that the downlink control information is received in a first portion of the discontinuous reception on interval; and
   refraining from starting or restarting the inactivity timer based at least in part on receiving the downlink control information in the first portion of the discontinuous reception on interval.

7. The method of claim 1, further comprising:
   identifying a discontinuous reception on interval;
   determining that the downlink control information is received in a second portion of the discontinuous reception on interval; and
   starting or restarting the inactivity timer based at least in part on receiving the downlink control information in the second portion of the discontinuous reception on interval.

8. The method of claim 1, further comprising:
   refraining from starting the retransmission timer after receiving the downlink control information based at least in part on an indicator included in the downlink control information.

9. The method of claim 1, further comprising:
   refraining from starting the retransmission timer after receiving the downlink control information based at least in part on a radio resource control configuration.

10. The method of claim 1, further comprising:
    identifying a discontinuous reception on interval;
    determining that the downlink control information is received in a first portion of the discontinuous reception on interval; and
    refraining from starting or restarting the retransmission timer based at least in part on receiving the downlink control information in the first portion of the discontinuous reception on interval.

11. The method of claim 1, further comprising:
    identifying a discontinuous reception on interval;
    determining that the downlink control information is received in a second portion of the discontinuous reception on interval; and
    starting or restarting the retransmission timer based at least in part on receiving the downlink control information in the second portion of the discontinuous reception on interval.

12. The method of claim 1, further comprising:
    refraining from transmitting a request for uplink resources based at least in part on the set of uplink resources being scheduled by the downlink control information.

13. The method of claim 12, further comprising:
    determining a first duration associated with transmitting the request for uplink resources and being scheduled the requested uplink resources;
    determining a second duration until the set of uplink resources is to be scheduled by the downlink control information; and
    refraining from transmitting the request for uplink resources based at least in part on the second duration being less than the first duration.

14. The method of claim 1, further comprising:
    determining a duration until a second set of uplink resources is to be scheduled by second downlink control information of the prescheduling type; and
    refraining from transmitting a request for uplink resources based at least in part on the duration being less than a threshold.

15. The method of claim 14, wherein the threshold is based at least in part on a second duration associated with transmitting the request for uplink resources and being scheduled the requested uplink resources.

16. The method of claim 14, wherein the threshold is based at least in part on a quality of service of a set of data at the UE that triggers a scheduling request.

17. The method of claim 1, further comprising:
receiving radio resource control information that indicates a configuration for the prescheduling type, the configuration comprising a periodicity, offset, a frequency position, or any combination thereof for receiving control information that is associated with the prescheduling type;
determining a timing for being scheduled uplink resources in response to a transmitted scheduling request; and
determining whether to transmit a scheduling request based at least in part on the timing and the configuration for the prescheduling type.

18. The method of claim 1, further comprising:
receiving radio resource control information that indicates recurring uplink resource positions configured for the UE and that the prescheduling type is associated with the recurring uplink resource positions, wherein receiving the downlink control information comprises:
receiving a medium access control information that indicates one or more uplink resource positions of the recurring uplink resource positions comprise the set of uplink resources.

19. The method of claim 1, further comprising:
determining, from a plurality of scheduling types, a scheduling type associated with the downlink control information, wherein the plurality of scheduling types comprises:
a first prescheduling type that uses the downlink control information to dynamically schedule uplink resources in anticipation of one or more requests for uplink resources,
a second prescheduling type that uses radio resource control information to statically indicate recurring uplink resource positions and a medium access control information trigger to dynamically schedule the set of uplink resources using one or more uplink resource positions of recurring uplink resource positions indicated by the second prescheduling type in anticipation of the one or more requests for uplink resources,
a third scheduling type that uses the downlink control information to dynamically schedule the set of uplink resources after receiving a request for uplink resources, and
a fourth scheduling type that uses radio resource control information to statically indicate recurring uplink resource positions and a downlink control information trigger to semi-statically schedule the set of uplink resources in recurring uplink resource positions indicated by the fourth scheduling type.

20. The method of claim 1, wherein the prescheduling type dynamically schedules uplink resources without receiving a request for uplink resources.

21. A method for wireless communications at a network entity, comprising:
transmitting one or more messages including a first scheduling grant corresponding to a semi-static scheduling type or a dynamic scheduling type;
selecting a prescheduling type for scheduling uplink resources for a user equipment (UE), the prescheduling type being used to preschedule a set of uplink resources for the UE in advance of receiving one or more requests for uplink resources from the UE; and
transmitting downlink control information in a downlink control information message that preschedules the set of uplink resources for the UE prior to receiving a request for uplink resources from the UE, the downlink control information indicating to the UE to refrain, in response to the downlink control information prescheduling the set of uplink resources for the UE in accordance with the selected prescheduling type, from restarting an inactivity timer, a retransmission timer, or both, wherein an expiration of the inactivity timer, the retransmission timer, or both, is determined relative to an initiation of the inactivity timer, the retransmission timer, or both, in response to transmission of the first scheduling grant.

22. The method of claim 21, further comprising:
using the prescheduling type to schedule the set of uplink resources based at least in part on the selecting; and
generating the downlink control information message comprising an indication that the downlink control information message is associated with the prescheduling type based at least in part on using the prescheduling type.

23. The method of claim 21, further comprising:
using the prescheduling type to schedule the set of uplink resources based at least in part on the selecting; and
generating the downlink control information message based at least in part on using the prescheduling type, wherein transmitting the downlink control information comprises transmitting the downlink control information message using a slot index, a symbol index, or a resource block index of a control channel or a shared channel associated with the prescheduling type.

24. The method of claim 21, further comprising:
transmitting radio resource control information that indicates a configuration for the prescheduling type, the configuration comprising a periodicity, offset, a frequency, or any combination thereof for receiving control information that is associated with the prescheduling type.

25. The method of claim 21, further comprising:
transmitting radio resource control information that indicates recurring uplink resource positions configured for the UE and that the prescheduling type is associated with the recurring uplink resource positions, wherein transmitting the downlink control information comprises:
transmitting a medium access control information that indicates one or more uplink resource positions of the recurring uplink resource positions comprise the set of uplink resources.

26. The method of claim 21, further comprising:
determining the prescheduling type from a plurality of scheduling types, the plurality of scheduling types comprising:
a first prescheduling type that uses the downlink control information to dynamically schedule the set of uplink resources in anticipation of the one or more requests for uplink resources,
a second prescheduling type that uses radio resource control information to statically indicate recurring uplink resource positions and a medium access control information trigger to dynamically schedule the set of uplink resources using one or more uplink resource positions of recurring uplink resource positions indicated by the second prescheduling type in anticipation of the one or more requests for uplink resources, a third scheduling type that uses the downlink control information to dynamically schedule the set of uplink resources after receiving a request for uplink resources, and a fourth scheduling type that uses radio resource control information to statically indicate recurring uplink resource positions and a downlink control information trigger to semi-statically schedule the set of uplink resources in recurring uplink resource positions indicated by the fourth scheduling type.

27. The method of claim 21, wherein the downlink control information is transmitted based at least in part on a discontinuous reception cycle configured for the UE.

28. A user equipment (UE) for wireless communications, comprising:

one or more memories storing processor-executable code; and one or more processors coupled with the one or more memories and individually or collectively operable to execute the code to cause the UE to:

receive one or more messages including a first scheduling grant corresponding to a semi-static scheduling type or a dynamic scheduling type;

initiate an inactivity timer, a retransmission timer, or both, in response to receiving the first scheduling grant;

receive downlink control information in a downlink control information message that preschedules a set of uplink resources for the UE prior to the UE requesting uplink resources;

refrain, in response to the downlink control information prescheduling the set of uplink resources for the UE in accordance with a prescheduling type, from restarting the inactivity timer, the retransmission timer, or both, wherein an expiration of the inactivity timer, the retransmission timer, or both, is determined relative to the initiation of the inactivity timer, the retransmission timer, or both, in response to reception of the first scheduling grant; and communicate using the set of uplink resources based at least in part on the downlink control information being associated with the prescheduling type.

29. The UE of claim 28, wherein the one or more processors are individually or collectively further operable to execute the code to cause the UE to:

decode the downlink control information message; and determine that the prescheduling type is associated with the downlink control information based at least in part on an indicator included in the decoded downlink control information message.

30. The UE of claim 28, wherein the one or more processors are individually or collectively further operable to execute the code to cause the UE to:

identify an index of a slot, symbol, or resource blocks used for a control channel or a shared channel in which the downlink control information message is received or an uplink transmission scheduled by the downlink control information message is performed; and determine that the prescheduling type is associated with the downlink control information message based at least in part on the index of the slot, the symbol, or the resource blocks.

31. The UE of claim 28, wherein the one or more processors are individually or collectively further operable to execute the code to cause the UE to:

receive radio resource control information that indicates a configuration for the prescheduling type, the configuration comprising a periodicity, offset, a frequency position, or any combination thereof for receiving control information that is associated with the prescheduling type; and determine that the prescheduling type is associated with the downlink control information message based at least in part on the configuration and a position of the downlink control information message in a control channel or a position of a shared channel.

32. The UE of claim 28, wherein the one or more processors are individually or collectively further operable to execute the code to cause the UE to:

determine a scheduling type of the downlink control information or an uplink transmission; and determine, based at least in part on the determined scheduling type, whether to start the inactivity timer.

33. The UE of claim 28, wherein the one or more processors are individually or collectively further operable to execute the code to cause the UE to:

identify a discontinuous reception on interval;

determine that the downlink control information is received in a first portion of the discontinuous reception on interval; and refrain from starting or restarting the inactivity timer based at least in part on receiving the downlink control information in the first portion of the discontinuous reception on interval.

34. The UE of claim 28, wherein the one or more processors are individually or collectively further operable to execute the code to cause the UE to:

identify a discontinuous reception on interval;

determine that the downlink control information is received in a second portion of the discontinuous reception on interval; and start or restart the inactivity timer based at least in part on receiving the downlink control information in the second portion of the discontinuous reception on interval.

35. The UE of claim 28, wherein the one or more processors are individually or collectively further operable to execute the code to cause the UE to:

refrain from starting the retransmission timer after receiving the downlink control information based at least in part on an indicator included in the downlink control information.

36. The UE of claim 28, wherein the one or more processors are individually or collectively further operable to execute the code to cause the UE to:

refrain from starting the retransmission timer after receiving the downlink control information based at least in part on a radio resource control configuration.

37. The UE of claim 28, wherein the one or more processors are individually or collectively further operable to execute the code to cause the UE to:

identify a discontinuous reception on interval;

determine that the downlink control information is received in a first portion of the discontinuous reception on interval; and refrain from starting or restarting the retransmission timer based at least in part on receiving the downlink control information in the first portion of the discontinuous reception on interval.

38. The UE of claim 28, wherein the one or more processors are individually or collectively further operable to execute the code to cause the UE to:

identify a discontinuous reception on interval;

determine that the downlink control information is received in a second portion of the discontinuous reception on interval; and start or restart the retransmission timer based at least in part on receiving the downlink control information in the second portion of the discontinuous reception on interval.

39. The UE of claim 28, wherein the one or more processors are individually or collectively further operable to execute the code to cause the UE to:
refrain from transmitting a request for the set of uplink resources based at least in part on the set of uplink resources being scheduled by the downlink control information.

40. The UE of claim 39, wherein the one or more processors are individually or collectively further operable to execute the code to cause the UE to:
determine a first duration associated with transmitting the request for uplink resources and being scheduled the requested set of uplink resources;
determine a second duration until the set of uplink resources is to be scheduled by the downlink control information; and
refrain from transmitting the request for uplink resources based at least in part on the second duration being less than the first duration.

41. The UE of claim 28, wherein the one or more processors are individually or collectively further operable to execute the code to cause the UE to:
determine a duration until a second set of uplink resources is to be scheduled by second downlink control information of the prescheduling type; and
refrain from transmitting a request for uplink resources based at least in part on the duration being less than a threshold.

42. The UE of claim 41, wherein the threshold is based at least in part on a second duration associated with transmitting the request for uplink resources and being scheduled the requested uplink resources.

43. The UE of claim 28, wherein the one or more processors are individually or collectively further operable to execute the code to cause the UE to:
receive radio resource control information that indicates a configuration for the prescheduling type, the configuration comprising a periodicity, offset, a frequency position, or any combination thereof for receiving control information that is associated with the prescheduling type;
determine a timing for being scheduled uplink resources in response to a transmitted scheduling request; and
determine whether to transmit a scheduling request based at least in part on the timing and the configuration for the prescheduling type.

44. The UE of claim 28, wherein the one or more processors are individually or collectively further operable to execute the code to cause the UE to:
receive radio resource control information that indicates recurring uplink resource positions configured for the UE and that the prescheduling type is associated with the recurring uplink resource positions, wherein receiving the downlink control information comprises receiving a medium access control information that indicates one or more uplink resource positions of the recurring uplink resource positions comprise the set of uplink resources.

45. A network entity for wireless communications, comprising:
one or more memories storing processor-executable code; and
one or more processors coupled with the one or more memories and individually or collectively operable to execute the code to cause the network entity to:
transmit one or more messages including a first scheduling grant corresponding to a semi-static scheduling type or a dynamic scheduling type;
select a prescheduling type for scheduling uplink resources for a user equipment (UE), the prescheduling type being used to preschedule a set of uplink resources for the UE in advance of receiving one or more requests for uplink resources from the UE; and
transmit downlink control information in a downlink control information message that preschedules the set of uplink resources for the UE prior to receiving a request for uplink resources from the UE, the downlink control information indicating to the UE to refrain, in response to the downlink control information prescheduling the set of uplink resources for the UE in accordance with the selected prescheduling type, from restarting an inactivity timer, a retransmission timer, or both, wherein an expiration of the inactivity timer, the retransmission timer, or both, is determined relative to an initiation of the inactivity timer, the retransmission timer, or both, in response to transmission of the first scheduling grant.

46. The network entity of claim 45, wherein the one or more processors are individually or collectively further operable to execute the code to cause the network entity to:
use the prescheduling type to schedule the set of uplink resources based at least in part on the selecting; and
generate the downlink control information message comprising an indication that the downlink control information message is associated with the prescheduling type based at least in part on using the prescheduling type.

47. The network entity of claim 45, wherein the one or more processors are individually or collectively further operable to execute the code to cause the network entity to:
use the prescheduling type to schedule the set of uplink resources based at least in part on the selecting; and
generate the downlink control information message based at least in part on using the prescheduling type, wherein transmitting the downlink control information comprises transmitting the downlink control information message using a slot index, a symbol index, or a resource block index of a control channel or a shared channel associated with the prescheduling type.

48. The network entity of claim 45, wherein the one or more processors are individually or collectively further operable to execute the code to cause the network entity to:
transmit radio resource control information that indicates a configuration for the prescheduling type, the configuration comprising a periodicity, offset, a frequency, or any combination thereof for receiving control information that is associated with the prescheduling type.

49. The network entity of claim 45, wherein the one or more processors are individually or collectively further operable to execute the code to cause the network entity to:
transmit radio resource control information that indicates recurring uplink resource positions configured for the UE and that the prescheduling type is associated with the recurring uplink resource positions, wherein transmitting the downlink control information comprises transmitting a medium access control information that indicates one or more uplink resource positions of the recurring uplink resource positions comprise the set of uplink resources.

50. A user equipment (UE) for wireless communications, comprising:
means for receiving one or more messages including a first scheduling grant corresponding to a semi-static scheduling type or a dynamic scheduling type;
means for initiating an inactivity timer, a retransmission timer, or both, in response to receiving the first scheduling grant;
means for receiving downlink control information in a downlink control information message that preschedules a set of uplink resources for the UE prior to the UE requesting uplink resources;
means for refraining, in response to the downlink control information prescheduling the set of uplink resources for the UE in accordance with a prescheduling type, from restarting the inactivity timer, the retransmission timer, or both, wherein an expiration of the inactivity timer, the retransmission timer, or both, is determined relative to the initiation of the inactivity timer, the retransmission timer, or both, in response to reception of the first scheduling grant; and
means for communicating using the set of uplink resources based at least in part on the downlink control information being associated with the prescheduling type.

51. The UE of claim 50, comprising:
means for decoding the downlink control information message; and
means for determining that the prescheduling type is associated with the downlink control information based at least in part on an indicator included in the decoded downlink control information message.

52. The UE of claim 50, further comprising:
means for identifying an index of a slot, symbol, or resource blocks used for a control channel or a shared channel in which the downlink control information message is received or an uplink transmission scheduled by the downlink control information message is performed; and
means for determining that the prescheduling type is associated with the downlink control information message based at least in part on the index of the slot, the symbol, or the resource blocks.

53. The UE of claim 50, further comprising:
means for receiving radio resource control information that indicates a configuration for the prescheduling type, the configuration comprising a periodicity, offset, a frequency position, or any combination thereof for receiving control information that is associated with the prescheduling type; and
means for determining that the prescheduling type is associated with the downlink control information message based at least in part on the configuration and a position of the downlink control information message in a control channel or a position of a shared channel.

54. The UE of claim 50, further comprising:
means for determining a scheduling type of the downlink control information or a scheduling type of an uplink transmission; and
means for determining, based at least in part on the determined scheduling type, whether to start the inactivity timer.

55. The UE of claim 50, further comprising:
means for identifying a discontinuous reception on interval;
means for determining that the downlink control information is received in a first portion of the discontinuous reception on interval; and
means for refraining from starting or restarting the inactivity timer based at least in part on receiving the downlink control information in the first portion of the discontinuous reception on interval.

56. The UE of claim 50, further comprising:
means for identifying a discontinuous reception on interval;
means for determining that the downlink control information is received in a second portion of the discontinuous reception on interval; and
means for starting or restarting the inactivity timer based at least in part on receiving the downlink control information in the second portion of the discontinuous reception on interval.

57. The UE of claim 50, further comprising:
means for refraining from starting the retransmission timer after receiving the downlink control information based at least in part on an indicator included in the downlink control information.

58. The UE of claim 50, further comprising:
means for refraining from starting the retransmission timer after receiving the downlink control information based at least in part on a radio resource control configuration.

59. The UE of claim 50, further comprising:
means for identifying a discontinuous reception on interval;
means for determining that the downlink control information is received in a first portion of the discontinuous reception on interval; and
means for refraining from starting or restarting the retransmission timer based at least in part on receiving the downlink control information in the first portion of the discontinuous reception on interval.

60. The UE of claim 50, further comprising:
means for identifying a discontinuous reception on interval;
means for determining that the downlink control information is received in a second portion of the discontinuous reception on interval; and
means for starting or restarting the retransmission timer based at least in part on receiving the downlink control information in the second portion of the discontinuous reception on interval.

61. The UE of claim 50, further comprising:
means for refraining from transmitting a request for uplink resources based at least in part on the set of uplink resources being scheduled by the downlink control information.

62. The UE of claim 61, further comprising:
means for determining a first duration associated with transmitting the request for uplink resources and being scheduled the requested uplink resources;
means for determining a second duration until the set of uplink resources is to be scheduled by the downlink control information; and
means for refraining from transmitting the request for uplink resources based at least in part on the second duration being less than the first duration.

63. The UE of claim 50, further comprising:
means for determining a duration until a second set of uplink resources is to be scheduled by second downlink control information of the prescheduling type; and means for refraining from transmitting a request for uplink resources based at least in part on the duration being less than a threshold.

64. The UE of claim 50, further comprising:
means for receiving radio resource control information that indicates a configuration for the prescheduling type, the configuration comprising a periodicity, offset, a frequency position, or any combination thereof for receiving control information that is associated with the prescheduling type;
means for determining a timing for being scheduled uplink resources in response to a transmitted scheduling request; and
means for determining whether to transmit a scheduling request based at least in part on the timing and the configuration for the prescheduling type.

65. The UE of claim 50, further comprising:
means for receiving radio resource control information that indicates recurring uplink resource positions configured for the UE and that the prescheduling type is associated with the recurring uplink resource positions, wherein receiving the downlink control information comprises receiving a medium access control information that indicates one or more uplink resource positions of the recurring uplink resource positions comprise the set of uplink resources.

66. A network entity for wireless communications, comprising:
means for transmitting one or more messages including a first scheduling grant corresponding to a semi-static scheduling type or a dynamic scheduling type;
means for selecting a prescheduling type for scheduling uplink resources for a user equipment (UE), the prescheduling type being used to preschedule a set of uplink resources for the UE in advance of receiving one or more requests for uplink resources from the UE; and
means for transmitting downlink control information in a downlink control information message that preschedules the set of uplink resources for the UE prior to receiving a request for uplink resources from the UE, the downlink control information indicating to the UE to refrain, in response to the downlink control information prescheduling the set of uplink resources for the UE in accordance with the selected prescheduling type, from restarting an inactivity timer, a retransmission timer, or both, wherein an expiration of the inactivity timer, the retransmission timer, or both, is determined relative to an initiation of the inactivity timer, the retransmission timer, or both, in response to transmission of the first scheduling grant.

67. The network entity of claim 66, further comprising:
means for using the prescheduling type to schedule the set of uplink resources based at least in part on the selecting; and
means for generating the downlink control information message comprising an indication that the downlink control information message is associated with the prescheduling type based at least in part on using the prescheduling type.

68. The network entity of claim 66, further comprising:
means for using the prescheduling type to schedule the set of uplink resources based at least in part on the selecting; and
means for generating the downlink control information message based at least in part on using the prescheduling type, wherein transmitting the downlink control information comprises transmitting the downlink control information message using a slot index, a symbol index, or a resource block index of a control channel or a shared channel associated with the prescheduling type.

69. The network entity of claim 66, further comprising:
means for transmitting radio resource control information that indicates a configuration for the prescheduling type, the configuration comprising a periodicity, offset, a frequency, or any combination thereof for receiving control information that is associated with the prescheduling type.

70. The network entity of claim 66, further comprising:
means for transmitting radio resource control information that indicates recurring uplink resource positions configured for the UE and that the prescheduling type is associated with the recurring uplink resource positions, wherein transmitting the downlink control information comprises transmitting a medium access control information that indicates one or more uplink resource positions of the recurring uplink resource positions comprise the set of uplink resources.

71. A non-transitory computer-readable medium storing code for wireless communications at a user equipment (UE), the code comprising instructions executable by one or more processors to:
receive one or more messages including a first scheduling grant corresponding to a semi-static scheduling type or a dynamic scheduling type;
initiate an inactivity timer, a retransmission timer, or both, in response to receiving the first scheduling grant;
receive downlink control information in a downlink control information message that preschedules a set of uplink resources for the UE prior to the UE requesting uplink resources;
refrain, in response to the downlink control information prescheduling the set of uplink resources for the UE in accordance with a prescheduling type, from restarting the inactivity timer, the retransmission timer, or both, wherein an expiration of the inactivity timer, the retransmission timer, or both, is determined relative to the initiation of the inactivity timer, the retransmission timer, or both, in response to reception of the first scheduling grant; and
communicate using the set of uplink resources based at least in part on the downlink control information being associated with the prescheduling type.

72. A non-transitory computer-readable medium storing code for wireless communications at a network entity, the code comprising instructions executable by one or more processors to:
transmit one or more messages including a first scheduling grant corresponding to a semi-static scheduling type or a dynamic scheduling type;
select a prescheduling type for scheduling uplink resources for a user equipment (UE), the prescheduling type being used to preschedule a set of uplink resources for the UE in advance of receiving one or more requests for uplink resources from the UE; and
transmit downlink control information in a downlink control information message that preschedules the set of uplink resources for the UE prior to receiving a request for uplink resources from the UE, the downlink control information indicating to the UE to refrain, in response to the downlink control information prescheduling the set of uplink resources for the UE in accordance with the selected prescheduling type, from restarting an inactivity timer, a retransmission timer, or both, wherein an expiration of the inactivity timer, the retransmission timer, or both, is determined relative to an initiation of the inactivity timer, the retransmission timer, or both, in response to transmission of the first scheduling grant.

\* \* \* \* \*